United States Patent
Mitsumori

(10) Patent No.: US 8,189,601 B2
(45) Date of Patent: May 29, 2012

(54) COMMUNICATION APPARATUS AND METHOD FOR TERMINATING A MAINTENANCE MESSAGE

(75) Inventor: Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 132 days.

(21) Appl. No.: 12/540,894

(22) Filed: Aug. 13, 2009

(65) Prior Publication Data

US 2010/0054132 A1 Mar. 4, 2010

(30) Foreign Application Priority Data

Aug. 26, 2008 (JP) ................................. 2008-217155

(51) Int. Cl.
*H04L 12/28* (2006.01)
(52) U.S. Cl. ...... 370/399; 370/397; 370/409; 370/241.1
(58) Field of Classification Search .................. 370/249, 370/236.2, 241.1, 397, 399, 409
See application file for complete search history.

(56) References Cited

U.S. PATENT DOCUMENTS

| | | | | |
|---|---|---|---|---|
| 5,872,770 | A * | 2/1999 | Park et al. ................... | 370/241.1 |
| 6,198,726 | B1 * | 3/2001 | Hayami et al. ............. | 370/236.2 |
| 6,700,873 | B1 * | 3/2004 | Sugaya et al. .............. | 370/241.1 |
| 6,850,520 | B1 * | 2/2005 | Takada et al. ................. | 370/389 |
| 6,865,158 | B2 * | 3/2005 | Iwamoto ....................... | 370/248 |
| 7,522,525 | B2 | 4/2009 | Mieno et al. | |
| 2008/0219173 | A1 * | 9/2008 | Yoshida et al. ............ | 370/241.1 |
| 2008/0259807 | A1 * | 10/2008 | Yan ............................... | 370/242 |
| 2009/0201819 | A1 * | 8/2009 | Mizutani et al. ........... | 370/241.1 |
| 2010/0169718 | A1 * | 7/2010 | Tausanovitch et al. ......... | 714/49 |

FOREIGN PATENT DOCUMENTS

WO WO-2004/040854 5/2004

* cited by examiner

*Primary Examiner* — Ricky Ngo
*Assistant Examiner* — Dewanda Samuel
(74) *Attorney, Agent, or Firm* — Fujitsu Patent Center

(57) ABSTRACT

A communication apparatus is disclosed for receiving one or more frames from a network. The communication apparatus includes a first determining part configured to search a first table by using a VLAN identifier included in one of the frames, a second determining part configured to search a second table by referring to a search result of the first determining part and using an OAM identifier included in the one of the frames, a selecting part configured to determine whether the one of the frames is an OAM frame according to the search result of the second determining part, and a terminating part configured to terminate the one of the frames determined as the OAM frame by the selecting part.

18 Claims, 38 Drawing Sheets

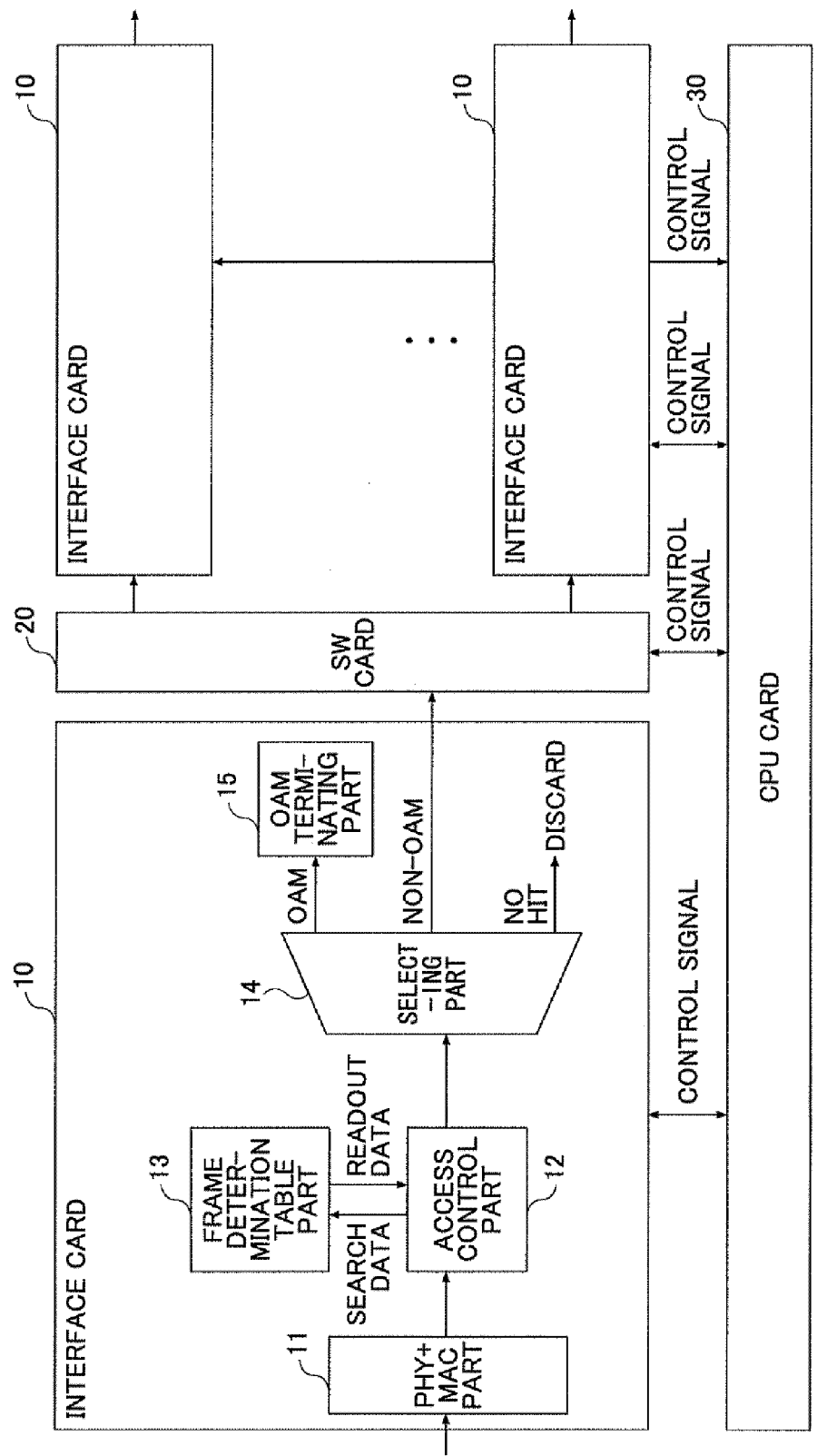

FIG.3

| | REGISTERED SEARCH DATA | | | | | | | | | READOUT DATA | | | |
|---|---|---|---|---|---|---|---|---|---|---|---|---|---|
| | A (1) | MAC DA (48) | MAC SA (48) | Ether Type (16) | VLAN tag (16) | Ether Type (16) | MEL (3) | V (5) | OPC (8) | OAM | OAM Type | DISCARD | OUTPUT CARD NUMBER | OUTPUT PORT NUMBER |
| ENTRY 1: VLAN+ OAM(1) | 1 | | | 0x8100 | | 0x9900 | | | 0x01 | 1 | 0x01 | 0 | INVALID | INVALID |
| ENTRY 2: VLAN+ OAM(2) | 1 | | | 0x8100 | | 0x9900 | | | 0x02 | 1 | 0x02 | 0 | INVALID | INVALID |
| ENTRY 3: VLAN+ OAM(3) | 1 | | | 0x8100 | | 0x9900 | | | 0x03 | 1 | 0x03 | 0 | INVALID | INVALID |
| ENTRY 4: VLAN+ NON-OAM(1) | 1 | | | 0x8100 | | Mask(32) | | | | 0 | INVALID | 0 | OUTPUT CARD NUMBER | OUTPUT PORT NUMBER |
| ENTRY N: NO-HIT ENTRY(1) | 1 | | | Mask(160) | | | | | | INVA-LID | INVALID | 1 | INVALID | INVALID |

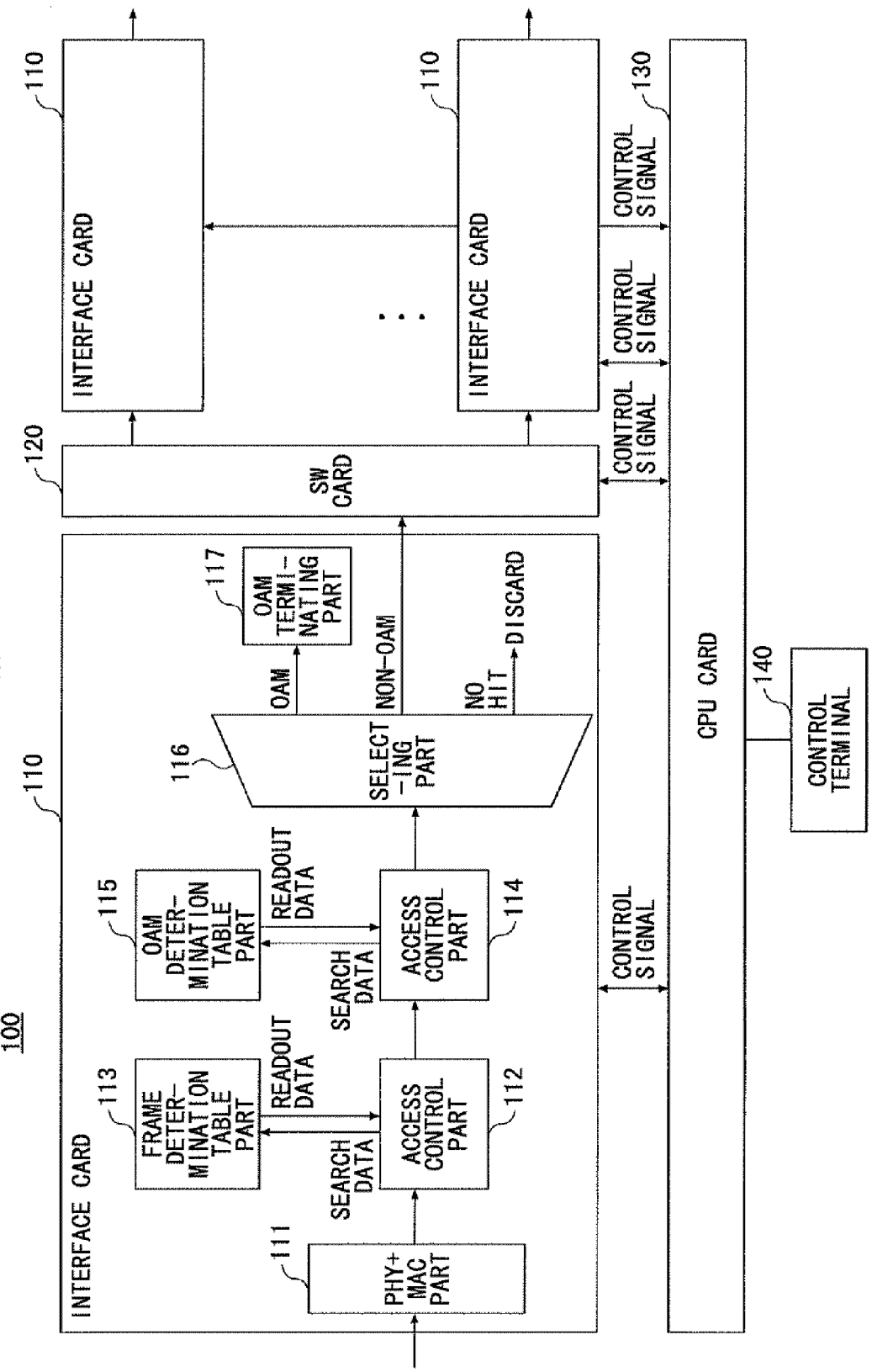

FIG.5

| | REGISTERED SEARCH DATA | | | | | READOUT DATA | | |
|---|---|---|---|---|---|---|---|---|
| | MAC DA (48) | MAC SA (48) | Ether Type (16) | VLAN tag (16) | | MEP | DISCARD | OUTPUT CARD NUMBER | OUTPUT PORT NUMBER |
| ENTRY 1: VLAN(1) | A(1) 1 | | 0x8100 | 100 | | 1 | 0 | | |
| ENTRY 2: VLAN(2) | A(1) 1 | | 0x8100 | 200 | | 0 | 0 | | |
| ... | | Mask(128) | | | | | | | |
| ENTRY N: NO-HIT ENTRY(1) | A(1) 1 | | | | | 0 | 1 | INVALID | INVALID |

FIG.6

| | | REGISTERED SEARCH DATA | | | | | READOUT DATA | | |
|---|---|---|---|---|---|---|---|---|---|
| | A(1) | MEP | Ether Type (16) | MEL (3) | V(5) | OPC(8) | OAM | DISCARD | OAM Type |
| ENTRY 1: OAM(1) | 1 | 1 | 0x9900 | | | 0x01 | 1 | 0 | 0x01 |
| ENTRY 2: OAM(2) | 1 | 1 | 0x9900 | | | 0x02 | 1 | 0 | 0x02 |
| ENTRY 3: OAM(3) | 1 | 1 | 0x9900 | | | 0x03 | 1 | 0 | 0x03 |
| | | | | ... | | | | ... | |
| ENTRY N: NO-HIT ENTRY(1) | 1 | | | Mask(33) | | | OAM | DISCARD | OAM Type |
| | | | | | | | 0 | 0 | INVALID |

FIG.7

| ENTRY | REGISTERED SEARCH DATA | | | | | READOUT DATA | | | |
|---|---|---|---|---|---|---|---|---|---|
| | | MAC DA (48) | MAC SA (48) | Ether Type (16) | VLAN tag (16) | MIP | DISCARD | OUTPUT CARD NUMBER | OUTPUT PORT NUMBER |
| ENTRY 1: VLAN(1) | A(1) 1 | | | 0x8100 | 100 | 1 | DISCARD | OUTPUT CARD NUMBER | OUTPUT PORT NUMBER |
| ENTRY 2: VLAN(2) | A(1) 1 | | | 0x8100 | 200 | 0 | DISCARD | OUTPUT CARD NUMBER | OUTPUT PORT NUMBER |
| ⋯ | ⋯ | | | | | | | | |
| ENTRY N: NO-HIT ENTRY(1) | A(1) 1 | Mask(128) | | | | MIP 0 | DISCARD 1 | INVALID | INVALID |

FIG.8

| | | REGISTERED SEARCH DATA | | | | READOUT DATA | | |
|---|---|---|---|---|---|---|---|---|
| ENTRY 1: OAM(1) | A(1) | MIP | Ether Type (16) | MEL (3) | V(5) | OPC(8) | OAM | DISCARD | OAM Type |
| | 1 | 1 | 0x9900 | | | 0x01 | 1 | 0 | 0x01 |
| ENTRY 2: OAM(2) | A(1) | MIP | Ether Type (16) | MEL (3) | V(5) | OPC(8) | OAM | DISCARD | OAM Type |
| | 1 | 1 | 0x9900 | | | 0x02 | 1 | 0 | 0x02 |
| ENTRY 3: OAM(3) | A(1) | MIP | Ether Type (16) | MEL (3) | V(5) | OPC(8) | OAM | DISCARD | OAM Type |
| | 1 | 1 | 0x9900 | | | 0x03 | 1 | 0 | 0x03 |
| | | | ⋯ | | | | | ⋯ | |
| ENTRY N: NO-HIT ENTRY(1) | A(1) | Mask(33) | | | | | OAM | DISCARD | OAM Type |
| | 1 | | | | | | 0 | 0 | INVALID |

FIG.10

| | | REGISTERED SEARCH DATA | | | | | READOUT DATA | | |
|---|---|---|---|---|---|---|---|---|---|
| | A(1) | MEP | MIP | Ether Type (16) | MEL (3) | V(5) | OPC(8) | OAM | DISCARD | OAM Type |
| ENTRY 1: OAM(1) | 1 | 1 | Mask | 0x9900 | | | 0x01 | 1 | 0 | 0x01 |
| ENTRY 2: OAM(2) | 1 | Mask | 1 | 0x9900 | | | 0x02 | 1 | 0 | 0x02 |
| ENTRY 3: OAM(3) | 1 | 1 | Mask | 0x9900 | | | 0x01 | 1 | 0 | 0x01 |
| ENTRY 4: OAM(4) | 1 | Mask | 1 | 0x9900 | | | 0x02 | 1 | 0 | 0x02 |
| ... | | | | | | | | | | |
| ENTRY N: NO-HIT ENTRY(1) | 1 | Mask(34) | | | | | | OAM | DISCARD | OAM Type |
| | | | | | | | | 0 | 0 | INVALID |

FIG.11

| ENTRY | REGISTERED SEARCH DATA | | | | | READOUT DATA | | | | |
|---|---|---|---|---|---|---|---|---|---|---|
| | A(1) | MAC DA (48) | MAC SA (48) | Ether Type (16) | VLAN tag (16) | MEP | MIP | DISCARD | OUTPUT CARD NUMBER | OUTPUT PORT NUMBER |
| ENTRY 1: VLAN(1) | 1 | | | 0x8100 | 100 | 1 | 0 | 0 | | |
| ENTRY 2: VLAN(2) | 1 | | | 0x8100 | 200 | 0 | 1 | 0 | | |
| ... | | | | | | | | | | |
| ENTRY N: NO-HIT ENTRY(1) | 1 | Mask (128) | | | | 0 | 0 | 1 | INVALID | INVALID |

FIG.12

| | | | REGISTERED SEARCH DATA | | | | READOUT DATA | | |
|---|---|---|---|---|---|---|---|---|---|
| | A(1) | MEP | MIP | Ether Type (16) | MEL (3) | V(5) | OPC(8) | OAM | DISCARD | OAM Type |
| ENTRY 1: OAM(1) | 1 | 1 | Mask | 0x9900 | | | 0x01 | 1 | 0 | 0x01 |
| ENTRY 2: OAM(2) | 1 | Mask | 1 | 0x9900 | | | 0x02 | 1 | 0 | 0x02 |
| | | | | ••• | | | | | | |
| ENTRY N-1: UNDEFINED OAM ENTRY(1) | A(1) | MEP | MIP | Ether Type (16) | MEL (3) | V(5) | OPC(8) | OAM | DISCARD | OAM Type |
| | 1 | 1 | Mask | 0x9900 | Mask | Mask | Mask | 1 | 1 | INVALID |
| ENTRY N: NO-HIT ENTRY(1) | A(1) | | | Mask(34) | | | | OAM | DISCARD | OAM Type |
| | 1 | | | | | | | 0 | 0 | INVALID |

FIG.14

| | A(1) | MEP | MIP | Ether Type (16) | MEL (3) | V(5) | OPC(8) | OAM | DISCARD | OAM Type |
|---|---|---|---|---|---|---|---|---|---|---|
| ENTRY 1: OAM(1) | 1 | 1 | Mask | 0x9900 | | | 0x01 | 1 | 0 | 0x01 |
| ENTRY 2: OAM(2) | 1 | Mask | 1 | 0x9900 | | | 0x02 | 1 | 0 | 0x02 |
| ⋯ | | | | | | | | | | |
| ENTRY N−1: UNDEFINED OAM ENTRY(1) | 1 | 1 | Mask | 0x9900 | Mask | Mask | Mask | 1 | 1 | OAM Type |
| ENTRY N: NO-HIT ENTRY(1) | 1 | Mask (34) | | | | | | 0 | 1 | INVALID |

REGISTERED SEARCH DATA | READOUT DATA

FIG.15

| | | REGISTERED SEARCH DATA | | | | READOUT DATA | | | | |
|---|---|---|---|---|---|---|---|---|---|---|
| ENTRY 1: VLAN(1) | A(1) | MAC DA (48) | MAC SA (48) | Ether Type (16) | VLAN tag (16) | Ether Type (16) | VLAN tag (16) | MEP | MIP | Tag | DISCARD | OUTPUT CARD NUMBER | OUTPUT PORT NUMBER |
| | 1 | | | 0x8100 | 100 | 0x8100 | 300 | 1 | 0 | 2 | 0 | | |
| ENTRY 2: VLAN(2) | A(1) | MAC DA (48) | MAC SA (48) | Ether Type (16) | VLAN tag (16) | Ether Type (16) | VLAN tag (16) | MEP | MIP | Tag | DISCARD | OUTPUT CARD NUMBER | OUTPUT PORT NUMBER |
| | 1 | | | 0x8100 | 200 | Mask | Mask | 0 | 1 | 1 | 0 | | |
| ENTRY 3: Untag(1) | A(1) | MAC DA (48) | MAC SA (48) | Ether Type (16) | VLAN tag (16) | Ether Type (16) | VLAN tag (16) | MEP | MIP | Tag | DISCARD | OUTPUT CARD NUMBER | OUTPUT PORT NUMBER |
| | 1 | | | Mask | Mask | Mask | Mask | 1 | 0 | 0 | 0 | | |
| ⋮ | | | | | | | | | | | | | |
| ENTRY N: NO-HIT ENTRY(1) | A(1) | Mask(128) | | | | | | MEP | MIP | Tag | DISCARD | OUTPUT CARD NUMBER | OUTPUT PORT NUMBER |
| | 1 | | | | | | | 0 | 0 | 0 | 1 | INVALID | INVALID |

FIG.16

| | | | REGISTERED SEARCH DATA | | | | | READOUT DATA | | |
|---|---|---|---|---|---|---|---|---|---|---|
| | A(1) | MEP | MIP | Ether Type (16) | MEL (3) | V(5) | OPC(8) | OAM | DISCARD | OAM Type |
| ENTRY 1: OAM(1) | 1 | 1 | Mask | 0x9900 | | | 0x01 | 1 | 0 | 0x01 |
| ENTRY 2: OAM(2) | 1 | Mask | 1 | 0x9900 | | | 0x02 | 1 | 0 | 0x02 |
| | | | | ... | | | | | | |
| ENTRY N-1: UNDEFINED OAM ENTRY(1) | 1 | 1 | Mask | 0x9900 | Mask | Mask | Mask | 1 | 1 | INVALID |
| ENTRY N: NO-HIT ENTRY(1) | 1 | | | Mask(34) | | | | 0 | 0 | INVALID |

FIG.17

| | | REGISTERED SEARCH DATA | | | | | READOUT DATA | | | | |
|---|---|---|---|---|---|---|---|---|---|---|---|
| | | MAC DA (48) | MAC SA (48) | Ether Type (16) | VLAN tag (16) | Ether Type (16) | VLAN tag (16) | MEP | MIP | Tag | DISCARD | OUTPUT CARD NUMBER | OUTPUT PORT NUMBER |
| ENTRY 1: VLAN(1) | A(1) Port 1 | 1 | | 0x8100 | 100 | 0x8100 | 300 | 1 | 0 | 2 | 0 | | |
| ENTRY 2: Untag(1) | A(1) Port 1 | 1 | | Mask | Mask | Mask | Mask | 1 | 0 | 0 | 0 | | |
| ENTRY 3: VLAN(2) | A(1) Port 2 | 1 | | 0x8100 | 200 | Mask | Mask | 0 | 1 | 1 | 0 | | |
| ENTRY 4: Untag(2) | A(1) Port 2 | 1 | | Mask | Mask | Mask | Mask | 0 | 0 | 0 | 1 | | |
| ... | | | | | | | | | | | | | |
| ENTRY N: NO-HIT ENTRY(1) | A(1) 1 | | | Mask | | | | 0 | 0 | 0 | 1 | INVALID | INVALID |

FIG.19

| | | REGISTERED SEARCH DATA | | | | | READOUT DATA | | | | |
|---|---|---|---|---|---|---|---|---|---|---|---|
| | Port | MAC DA (48) | MAC SA (48) | Ether Type (16) | VLAN tag (16) | Ether Type (16) | VLAN tag (16) | MEP | MIP | Tag | DIS-CARD | DISCARD FACTOR | OUTPUT CARD NUMBER | OUTPUT PORT NUMBER |
| ENTRY 1: VLAN(1) A(1) | 1 | 1 | | 0x8100 | 100 | 0x8100 | 300 | 1 | 0 | 2 | 0 | 0 | | |
| ENTRY 2: Untag(1) A(1) | 1 | 1 | | Mask | Mask | Mask | Mask | 1 | 0 | 0 | 0 | 0 | | |
| ENTRY 3: VLAN(2) A(1) | 1 | 2 | | 0x8100 | 200 | Mask | Mask | 0 | 1 | 1 | 0 | 0 | | |
| ENTRY 4: Untag(2) A(1) | 1 | 2 | | Mask | Mask | Mask | Mask | 0 | 0 | 0 | 1 | 1 | | |
| ... | | | | | | | | | | | | | | |
| ENTRY N: NO-HIT ENTRY(1) A(1) | 1 | 1 | | Mask | | | | 0 | 0 | 0 | 1 | 2 | INVALID | INVALID |

FIG.20

| | | | REGISTERED SEARCH DATA | | | | | READOUT DATA | | |
|---|---|---|---|---|---|---|---|---|---|---|
| | A(1) | MEP | MIP | Ether Type (16) | MEL (3) | V(5) | OPC(8) | OAM | DISCARD | DISCARD FACTOR | OAM Type |
| ENTRY 1: OAM(1) | 1 | 1 | Mask | 0x9900 | | | 0x01 | 1 | 0 | 0 | 0x01 |
| ENTRY 2: OAM(2) | 1 | Mask | 1 | 0x9900 | | | 0x02 | 1 | 0 | 0 | 0x02 |
| ... | | | | | | | | | | | |
| ENTRY N-1: UNDEFINED OAM ENTRY(1) | 1 | 1 | Mask | 0x9900 | Mask | Mask | Mask | 1 | 1 | 3 | INVALID |
| ENTRY N: NO-HIT ENTRY(1) | 1 | | | Mask(34) | | | | 0 | 0 | 0 | INVALID |

FIG.23

| | | | | REGISTERED SEARCH DATA | | | | READOUT DATA | | | | | | |
|---|---|---|---|---|---|---|---|---|---|---|---|---|---|---|
| | A (1) | Port | MAC DA (48) | MAC SA (48) | Ether Type (16) | VLAN tag (16) | Ether Type (16) | VLAN tag (16) | MEP | MIP | Tag | DIS-CARD | DIS-CARD FACTOR | OUTPUT CARD NUMBER | OUTPUT PORT NUMBER | BP |
| ENTRY 1: VLAN(1) | 1 | 1 | | | 0x8100 | 100 | 0x8100 | 300 | 1 | 0 | 2 | 0 | 0 | | | 1 |
| ENTRY 2: Untag(1) | 1 | 1 | | | Mask | Mask | Mask | Mask | 1 | 0 | 0 | 0 | 0 | | | 1 |
| ENTRY 3: VLAN(2) | 1 | 2 | | | 0x8100 | 200 | Mask | Mask | 0 | 1 | 1 | 0 | 0 | | | 0 |
| ENTRY 4: Untag(2) | 1 | 2 | | | Mask | Mask | Mask | Mask | 0 | 0 | 0 | 1 | 1 | | | 0 |
| ... | | | | | | | | | | | | | | | | |
| ENTRY N: NO-HIT ENTRY(1) | 1 | 1 | | | Mask | | | | 0 | 0 | 0 | 1 | 2 | INVALID | INVALID | INVA-LID |

FIG.24

| | | REGISTERED SEARCH DATA | | | | | READOUT DATA | | | |
|---|---|---|---|---|---|---|---|---|---|---|
| | A(1) | MEP | MIP | Ether Type (16) | MEL (3) | V(5) | OPC(8) | OAM | DISCARD | DISCARD FACTOR | OAM Type |
| ENTRY 1: OAM(1) | 1 | 1 | Mask | 0x9900 | | | 0x01 | 1 | 0 | 0 | 0x01 |
| ENTRY 2: OAM(2) | 1 | Mask | 1 | 0x9900 | | | 0x02 | 1 | 0 | 0 | 0x02 |
| ... | | | | | | | | | | | |
| ENTRY N-1: UNDEFINED OAM ENTRY(1) | 1 | 1 | Mask | 0x9900 | | | Mask | 1 | 1 | 3 | INVALID |
| ENTRY N: NO-HIT ENTRY(1) | 1 | Mask(34) | | | | | | 0 | 0 | 0 | INVALID |

FIG.27

| | | REGISTERED SEARCH DATA | | | | | READOUT DATA | | | | | | | |
|---|---|---|---|---|---|---|---|---|---|---|---|---|---|---|
| | A (1) | Port | MAC DA (48) | MAC SA (48) | Ether Type (16) | VLAN tag (16) | Ether Type (16) | VLAN tag (16) | MEP | MIP | PTag | DIS-CARD | DIS-CARD FACTOR | OUTPUT CARD NUMBER | OUTPUT PORT NUMBER | FRAME ID |
| ENTRY 1: VLAN(1) | 1 | 1 | | | 0x8100 | 100 | 0x8100 | 300 | 0 | 0 | 2 | 0 | 0 | OUTPUT CARD NUMBER | OUTPUT PORT NUMBER | 1 |
| ENTRY 2: Untag(1) | 1 | 1 | | | Mask | Mask | Mask | Mask | 0 | 0 | 0 | 0 | 0 | OUTPUT CARD NUMBER | OUTPUT PORT NUMBER | 2 |
| ENTRY 3: VLAN(2) | 1 | 2 | | | 0x8100 | 200 | Mask | Mask | 0 | 1 | 1 | 0 | 0 | OUTPUT CARD NUMBER | OUTPUT PORT NUMBER | INVALID |
| ENTRY 4: Untag(2) | 1 | 2 | | | Mask | Mask | Mask | Mask | 0 | 0 | 0 | 1 | 1 | OUTPUT CARD NUMBER | OUTPUT PORT NUMBER | INVALID |
| ENTRY N: NO-HIT ENTRY(1) | 1 | | | | Mask | | | | 0 | 0 | 0 | 1 | 2 | INVALID | INVALID | INVALID |

FIG.34

| | | REGISTERED SEARCH DATA | | | | | | READOUT DATA | | | | | | | |
|---|---|---|---|---|---|---|---|---|---|---|---|---|---|---|---|
| | A(1) | Port | MAC DA (48) | MAC SA (48) | Ether Type (16) | VLAN tag (16) | Ether Type (16) | VLAN tag (16) | MEP MIP Tag | MEL 1 | MEL 2 | MEL1 OAM Type | MEL2 OAM Type | DIS-CARD | DIS-CARD FACTOR | OUTPUT CARD NUMBER | OUTPUT PORT NUMBER |
| ENTRY 1: VLAN(1) | 1 | 1 | MAC DA | MAC SA | 0x8100 | 100 | Ether Type | 300 | 1 | 2 | 1 | 1 | 2 | 0 | 0 | | |
| ENTRY 2: Untag(1) | 1 | 1 | MAC DA | MAC SA | Mask | Mask | Ether Type | VLAN tag | 0 | 2 | 1 | 2 | 2 | 0 | 0 | | |
| ENTRY 3: VLAN(2) | 1 | 2 | MAC DA | MAC SA | 0x8100 | 200 | Ether Type | Mask | 1 | 1 | 0 | 1 | 0 | 0 | 0 | | |
| ENTRY 4: Untag(2) | 1 | 2 | MAC DA | MAC SA | Mask | Mask | Mask | Mask | 0 | 0 | 0 | 0 | 0 | 1 | 1 | | |
| ... | | | | | | | | | | | | | | | | | |
| ENTRY N: NO-HIT ENTRY(1) | 1 | 1 | Mask | | | | | | 0 | 0 | 0 | 0 | 0 | 1 | 2 | INVALID | INVALID |

FIG.35

| | | REGISTERED SEARCH DATA | | | | | READOUT DATA | | | |
|---|---|---|---|---|---|---|---|---|---|---|
| | A(1) | MEP | MIP | Ether Type (16) | MEL (3) | V(5) | OPC(8) | OAM | DISCARD | DISCARD FACTOR | OAM Type |
| ENTRY 1: OAM(1) | 1 | 1 | Mask | 0x9900 | Mask | | 0x01 | 1 | 0 | 0 | 0x01 |
| ENTRY 2: OAM(2) | 1 | Mask | 1 | 0x9900 | Mask | | 0x02 | 1 | 0 | 0 | 0x02 |
| ⋯ | | | | | | | | | | | |
| ENTRY N-1: UNDEFINED OAM ENTRY(1) | 1 | 1 | Mask | 0x9900 | Mask | | Mask | 1 | 1 | 3 | INVALID |
| ENTRY N: NO-HIT ENTRY(1) | 1 | Mask(34) | | | | | | 0 | 0 | 0 | INVALID |

COMMUNICATION APPARATUS AND METHOD FOR TERMINATING A MAINTENANCE MESSAGE

CROSS-REFERENCE TO RELATED APPLICATIONS

This application is based upon and claims the benefit of priority of Japanese Patent Application No. 2008-217155 filed on Aug. 26, 2008, the entire contents of which are incorporated herein by reference.

FIELD

The embodiments discussed herein are related to a communication apparatus having a virtual network function, a maintenance function and accommodating LAN lines and a method for terminating a maintenance message.

BACKGROUND

In recent years, standardization of ITU-T Y.1731 OAM (Operations Administration and Maintenance), IEEE 802.3ag as an OAM function of Ethernet (Registered Trademark) is progressing and the demand for a communication apparatus having an OAM function for accommodating Ethernet lines is growing. In the following description, WAN (Wide Area Network) and MAN (Metropolitan Area Network) are included in the term "LAN (Local Area Network)". Further, Ethernet (Registered Trademark) signals may also be referred to as LAN signals; Ethernet (Registered Trademark) frames may also be referred to as LAN frames; Ethernet (Registered Trademark) lines may also be referred to as LAN lines; and Ethernet (Registered Trademark) network may also be referred to as LANs.

The term "OAM", an abbreviation for Operations, Administration, and Maintenance and represents a maintenance function. In this case, in using Ethernet (Registered Trademark) OAM, an OAM dedicated message (hereinafter also simply referred to as "OAM message") is included in a LAN frame. This LAN frame is referred to as an "E-OAM frame" or an "OAM frame". By transmitting/receiving the E-OAM frame on a LAN frame communications network, communications status (e.g., disconnection) between communication apparatuses can be monitored.

In a communication apparatus accommodating a LAN line(s), the communication apparatus is typically adaptable to a VLAN (Virtual LAN). Further, the OAM function is desired to be applicable with respect to each VLAN (i.e. in VLAN units). Typically, in a LAN provided by a carrier, each user is managed with a different VLAN. Accordingly, by providing the OAM function in VLAN units, the carrier can perform monitoring/maintenance on the LAN line with respect to each user managed in VLAN units. Thus, maintenance can be provided with higher reliability.

The OAM function includes various messages such as CC (Continuity Check), LB (Loop Back), and LT (Link Trace). The communication apparatus including the OAM function is to include different OAM messages in VLAN units.

Each OAM frame can be set with a desired OAM level. With the OAM frame, different OAM levels can be set for each communication apparatus in the same VLAN. Accordingly, different sections in the LAN can be monitored.

FIG. 1 is a schematic diagram of a communication apparatus according to a related art example. In FIG. 1, function parts of the transmitting side are not illustrated. In FIG. 1, interface cards 10 transmit/receive LAN frames. A switch card (SW card) 20 performs exchanging of LAN frames between the interface cards 10. A CPU (Central Processing Unit) card 30 is for performing setting/monitoring on each of the cards 10, 20. The CPU card 30 is connected to each card 10, 20 for transmitting/receiving control signals. By using the control signals, the CPU card 30 can set table information or gather, for example, failure alarm information.

A PHY+MAC part 11 provided in the interface card 10 has a PHY portion and a MAC portion. The PHY portion performs predetermined processes for LAN frame transfer in the physical layer. The MAC portion performs predetermined processes for LAN frame transfer in the MAC layer. An access control part 12 controls transmission of search data to a frame determination table part 13 and receiving read out data from the frame determination table part 13.

The frame determination table part 13 includes a frame determination table. The frame determination table part 13 receives search data from the access control part 12 and searches the frame determination table for matching registered search data. In a case where matching registered search data (Hit:Match) are found, the frame determination table part 13 transmits data (read out data) read out from an entry corresponding to the matching registered search data. The read out data include information indicating results of determining whether a frame is an OAM frame. In a case where no matching registered search data are found (No Hit:No Match), the frame determination table part 13 transmits data indicating that there are no data matching the frame (no hit). For example, CAM (Content Addressable Memory) may be used as the frame determination table part 13.

A selecting part 14 selects a subsequent process of a corresponding frame based on determination results (e.g., whether the frame is an OAM frame, whether no matching registered search data are found) received from the access control part 12. In a case where a frame is determined to be an OAM frame by the frame determination table part 13, the selecting part 14 transfers the frame to an OAM terminating part 15. The OAM terminating part 15 performs an OAM terminating process on a frame determined to be an OAM frame by the frame determination table part 13. In a case where a frame is determined as not being an OAM frame (non-OAM frame) by the frame determination table part 13, the selecting part 14 transfers the frame to the Switch card 20. In a case where a frame is determined as no hit by the frame determination table part 13, the frame is discarded.

FIG. 2A illustrates a VLAN frame format, and FIG. 2B illustrates an E-OAM frame format attached with a VLAN frame. In FIGS. 2A and 2B, the numerals in the parentheses indicate the number of bits. Further, "MAC DA" indicates a MAC destination address, and "MAC SA" indicates a MAC origin address. Further, "Ether Type" indicates a frame type of a corresponding frame. For example, the value indicated in Ether type differs depending on whether the frame is, for example, a VLAN frame, an IP frame, or an OAM frame. In this example, the Ether Type corresponding to a VLAN frame is "0×8100", the Ether Type corresponding to an IP frame is "0×800", and the Ether Type corresponding to an OAM frame "0×9900".

Further, "FCS (Frame Check Sequence)" indicates Cyclic Redundancy Code (CRC)-32 data installed at a rearmost of a frame. FIG. 2A illustrates a case where an IP frame is installed in a VLAN frame. FIG. 2B illustrates a case where an OAM frame is installed in a VLAN frame.

As illustrated in FIG. 2B, the OAM frame includes various data such as MEL, V, and OPC. In FIG. 2B, "MEL" indicates OAM level data, "V" indicates version data, and "OPC" indicates Operation Code data. "Others" include data that differ according to each type of OAM message.

FIG. 3 illustrates an exemplary configuration of entries of a frame determination table of the frame determination table part 13. In FIG. 3, the numerals in the parentheses indicate the number of bits. The frame determination table part 13 is configured as a CAM (Content Addressable Memory). The CAM includes search data and readout data corresponding to the search data.

In this example, data are extracted from a predetermined area of an input LAN frame and transmitted as search data to the CAM. Then, it is determined whether there are data matching the search data. According to the determination result, the type of frame is determined.

In FIG. 3, the following entries are stored in the CAM. Entries 1-3 are each an entry of a VLAN+OAM frame. In order to provide the OAM function in VLAN units, data containing a VLAN tag are registered as search data in the frame determination table. In FIG. 3, the part corresponding to "Mask" (which indicates "don't care") is not a search target.

Further, in FIG. 3, "A" (which indicates "Availability") is referred for determining whether an entry of the CAM is valid or invalid. For example, "A=1" that an entry is valid. Further, "MEL", "V", and "OPC" are registered as search data for determining the level, version, and type of OAM, respectively. "OPC" indicates various types of OAM messages. For example, "0×01" ("0×0" is a prefix for representing hexadecimal numerals) indicates a CC message, "0×02" indicates an LBR message, and "0×03" indicates an LBM message. An entry containing an OPC is added with respect to each type of OAM of each VLAN.

The "OAM" of the readout data indicates a non-OAM frame where OAM=0 and indicates an OAM frame where OAM=1. The "OAM Type" of the readout data indicate the type of OAM of each entry. For example, in a case where OAM=0, the content of "OAM Type" is invalid because the frame is a non-OAM frame. "Discard" indicates whether the frame is to be discarded. For example, in a case where the frame is to be discarded, "Discard=1". Further, "output card number" and "output port number" are stored in the readout data.

Because an OAM frame ends at the interface card receiving the OAM frame, the output card number and the output port number in the readout data are invalid. In FIG. 3, Entry 4 is an entry of a VLAN+non-OAM frame. The frame matching this entry is determined as a non-OAM frame. After obtaining the output card number and the output port number from the readout data, the non-OAM frame is transferred to the switch card 20 and transmitted to a corresponding output port of an interface card 10 at the output side via the switch card 20.

Entry N is an entry of a no-hit frame. The entry N is stored in a rearmost part of the frame determination table 13. The searching operation in the CAM (Content Addressable Memory) is started from a high order (low number) address of the frame determination table. In a case where a match is found (hit), the frame determination table part 13 ends searching and transmits corresponding readout data matching the entry to the access control part 12.

In this example, low number addresses are located at the upper side of the frame determination table. Thus, in a case where search data match none of the entries, the search data finally match the rearmost entry (No-hit entry). Because the no-hit entry is entirely formed of a mask portion except for the "A (Availability)" portion, the no-hit entry will match the search data regardless of the content of the search data. In this case, the frame matching the no-hit entry is to be discarded as indicated in the "discard" portion (indicated as "1") of the readout data. An ending operation of E-OAM is described below.

With reference to FIG. 1, in a case where a frame is input to the interface card 10, the PHY+MAC part 11 receives the frame. After predetermined processes in the physical layer and the MAC layer are performed on the frame, the access control part 12 extracts data starting from the top (header) to 160 bits, assigns a valid bit "A" (for the frame determination table part 13) to the top (header) of the extracted data, and transmits the extracted data as search data to the frame determination table part 13. The frame determination table part 13 searches its frame determination table based on the search data received from the access control part 12 and determines whether there are any matching registered search data. The result of the search is transmitted to the access control part 12.

Then, the selecting part 14 selects a subsequent process based on the search/determination result of the frame determination table part 13.

Accordingly, the type of received frame is determined and an appropriate process is performed on the frame based on the determination result.

It is to be noted that, there is proposed a configuration of a L2 switch having a VLAN function in which a VLAN function part maps a frame to a predetermined VLAN, a frame categorizing part prioritizes the frame, and an OAM monitoring part inserts a monitoring frame in the VLAN (see, for example, International Publication Pamphlet No. WO2004/040854).

According to a related art example, in a case of setting OAM to each VLAN, it is necessary to set single VLAN+non-OAM frame entries and plural VLAN+OAM frame entries A typical communication apparatus is required to accommodate several thousands of VLANs. Further, another communication apparatus is to accommodate several ten thousands of VLANs in a case of double-tagging (e.g., Q-in-Q).

In a case of setting plural OAM messages in VLAN units, the number of necessary table entries increases significantly. However, due to the limited capacity of CAM, a necessary number of VLANs and OAM functions cannot be set.

In order to set an OAM function(s) with respect to a required number of VLANs, memory capacity of a frame determination table needs to be increased significantly and the number of components is to be increased. This leads to an increase of manufacturing cost and an increase of power consumption.

SUMMARY

According to an aspect of the invention, there is provided a communication apparatus for receiving one or more frames from a network, the communication apparatus including: a first determining part configured to search a first table by using a VLAN identifier included in one of the frames; a second determining part configured to search a second table by referring to a search result of the first determining part and using a OAM identifier included in the one of the frames; a selecting part configured to determine whether the one of the frames is an OAM frame according to the search result of the second determining part; and a terminating part configured to terminate the one of the frames determined as the OAM frame by the selecting part.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIG. 1 is a schematic diagram of a communication apparatus according to a related art example;

FIG. 3 illustrates an exemplary configuration of entries of a frame determination table of a frame determination table part according to a related art example;

FIG. 4 is a schematic diagram of a communication apparatus according to a first embodiment of the present invention;

FIG. 5 illustrates a configuration of an entry of a frame determination table of a frame determination table part according to a first embodiment of the present invention;

FIG. 6 illustrates a configuration of entries of an OAM determination table of an OAM determination table part according to a first embodiment;

FIG. 7 illustrates a configuration of an entry of a frame determination table of a frame determination table part according to a second embodiment of the present invention;

FIG. 8 illustrates a configuration of an entry of an OAM determination table of an OAM determination table part according to a second embodiment of the present invention;

FIG. 10 illustrates a configuration of an entry of an OAM determination table of a OAM determination table part according to a third embodiment of the present invention;

FIG. 11 illustrates a configuration of an entry of a frame determination table of a frame determination table part according to a fourth embodiment of the present invention;

FIG. 12 illustrates a configuration of an entry of an OAM determination table of an OAM determination table part according to a fourth embodiment of the present invention;

FIG. 14 illustrates a configuration of an entry of an OAM determination table of an OAM determination table part according to a fifth embodiment of the present invention;

FIG. 15 illustrates a configuration of an entry of a frame determination table of a frame determination table part according to a sixth embodiment of the present invention;

FIG. 16 illustrates a configuration of an entry of an OAM determination table of an OAM determination table part according to a sixth embodiment of the present invention;

FIG. 17 illustrates a configuration of an entry of a frame determination table of a frame determination table part according to a seventh embodiment of the present invention;

FIG. 19 illustrates a configuration of an entry of a frame determination table of a frame determination table part according to an eighth embodiment of the present invention;

FIG. 20 illustrates a configuration of an entry of an OAM determination table of an OAM determination table part according to an eighth embodiment of the present invention;

FIG. 23 illustrates a configuration of an entry of a frame determination table of a frame determination table part according to a tenth embodiment of the present invention;

FIG. 24 illustrates a configuration of an entry of an OAM determination table of an OAM determination table part according to a tenth embodiment of the present invention;

FIG. 27 illustrates a configuration of an entry of a frame determination table of a frame determination table part of an input side interface card according to a thirteenth embodiment of the present invention;

FIG. 34 illustrates a configuration of an entry of a frame determination table of frame determination table parts according to a fifteenth embodiment of the present invention;

FIG. 35 illustrates a configuration of an entry of an OAM determination table of OAM determination table parts according to a fifteenth embodiment of the present invention;

DESCRIPTION OF EMBODIMENTS

Figure 2A:
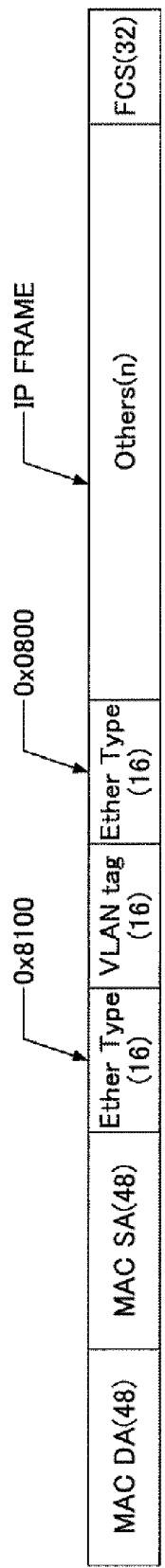
FIG. 2A illustrates a VLAN frame format.
Figure 2B:
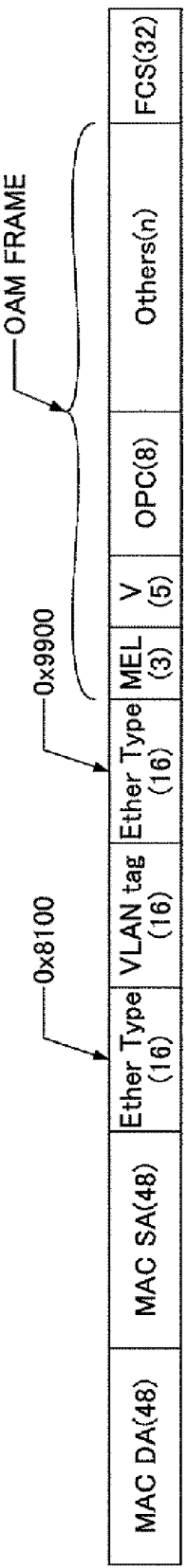
FIG. 2B illustrates an E-OAM frame format attached with a VLAN frame.

In the following, embodiments of the present invention are described with reference to the accompanying drawings.

[First Embodiment]

FIG. 4 is a schematic diagram of a communication apparatus 100 according to a first embodiment of the present invention. In the communication apparatus 100 of FIG. 4, an interface card 110 stores LAN frames and transmits/receives the LAN frames. A switch card 120 exchanges LAN frames between interface cards 110. A CPU card 130 including a processor (Central Processing Unit, CPU) controls the setting/monitoring of each of the cards 110, 120.

A control terminal 140 connected to the CPU card 130 controls, for example, setting of table data in the interface card 110 or collecting failure alarm data from the interface card 110 by causing the CPU card 130 to transmit/receive control signals to/from the cards 110, 120.

A PHY+MAC part 111 of the interface card 110 includes a PHY (physical layer) portion and a MAC layer portion. In a case where the interface card 110 receives a LAN frame, the PHY+MAC part 111 performs a physical layer process on the LAN frame in the PHY portion and then performs a MAC layer process on the LAN frame. Then, an access control part 112 extracts the first to the $128^{th}$ bits of data from the LAN frame and transmits the extracted data as search data (data to be searched) to a frame determination table part 113. The frame determination table part 113 includes a frame determination table having a format (bitmap) different from that of the related art example. The frame determination table part 113 includes a CAM (Content Addressable Memory).

An access control part 114 is for controlling access with respect to an OAM determination table part 115. The access control part 114 extracts the $129^{th}$ to the $160^{th}$ bits from the LAN frame and transmits the extracted data as search data to the OAM determination table part 115.

The OAM determination table part 115 performs OAM frame determination on the data transmitted from the access control part 114. The same as the frame determination table part 113, the OAM determination table part 115 also includes a CAM.

A selecting part 116 selects a subsequent process to be performed on the LAN frame based on the determination result (OAM, non-OAM, no-hit) transmitted from the access control part 114.

An OAM terminating part 117 performs an OAM terminating process on the LAN frame in a case where the LAN frame is determined as an OAM frame by the OAM determination table part 115. In a case where the LAN frame is determined as not being an OAM frame (non-OAM frame) by the OAM determination table part 115, the selecting part 116 transfers the LAN frame to the Switch card 120. In a case where the LAN frame is determined as no hit by the frame determination table part 115, the LAN frame is discarded.

FIG. 5 illustrates a configuration of an entry of a frame determination table of the frame determination table part 113 according to the first embodiment of the present invention. In FIG. 5, the numerals in the parentheses indicate the number of bits. The frame determination table part 113 is configured to register one entry with respect to each VLAN entry. Although data such as "A (Availability)" indicating the validity of the entry, "MAC DA", "MAC SA", "Ether Type", "VLAN tag" are included in the registered search data of the frame determination table part 113, the registered search data of the frame determination table part 113 do not include OAM frame determination data (data for determining whether a LAN frame is an OAM frame).

The readout data have MEP flag data of one bit added thereto. However, OAM flag data and OAM Type data are omitted from the readout data. "Discard" indicates whether the LAN frame is to be discarded. In a case where the LAN frame is to be discarded, "1" is stored in "Discard" of the readout data. Further, "output card number" and "output port number" are stored in the readout data.

The "MEP" flag is a flag indicating a MEG (Maintenance Entity Group) End Point. "MEG" indicates a Maintenance Group which represents ME (Maintenance Entity) belonging to the same service instance. The MEP flag serves as an end point identifier indicating origination and termination of OAM frames for a given MEG.

In this embodiment, the MEG is defined in VLAN units. In E-OAM, there are two types of OAM, in which one indicates an End Point and the other indicates an Intermediate Point.

For example, in a case where a CC message is transmitted from a communication apparatus on one end to a communication apparatus on the other end, the MEP is set in the communication apparatuses responsible for origination and termination of the transmission of the CC message. The MIP is set in a communication apparatus(es) located between peer MEPs and forwards, for example, LB messages and LT messages.

In a case where a corresponding VLAN is an MEP (a case where a communication apparatus is set as an end point), the frame determination table part 113 of FIG. 5 sets the MEP flag of the readout data as "1". For example, in the Entry 1 where the VLAN tag=100, the MEP flag is set to "1". In the Entry 2 where the VLAN tag=200, the MEP flag is set to "0" because the entry is not set with an OAM.

FIG. 6 illustrates a configuration of entries of the OAM determination table of the OAM determination table part 115 according to the first embodiment. In FIG. 6, the numerals in the parentheses indicate the number of bits. The OAM determination table part 115, regardless of the type of VLAN, stores an entry corresponding to each OAM message of the communication apparatus 100. The OAM determination table part 115 also stores registered search data such as "A (Availability)" indicating validity of the entry, the "MEP" flag obtained from the frame determination table part 113, "Ether Type", MEL (MEG Level), "V", and "OPC". The readout data of the frame determination includes data such as "OAM" flag, "Discard", and "OAM Type". The same as the frame determination table 113, an entry of a no-hit frame (no-hit entry) is stored in a rearmost part of the OAM determination table 115.

In a case where the interface card 110 receives a LAN frame, the LAN frame is transmitted to the access control part 112 via the PHY+MAC part 111. The access control part 12 extracts the first bit to the $128^{th}$ bit of data from the LAN frame and transmits the extracted data as search data to the frame determination table part 113.

The frame determination table part 113 includes a frame determination table in which VLAN entries are registered. The frame determination table part 113 determines that there is a match (hit) when the extracted data of the LAN frame has a valid VLAN value. In this embodiment, the frame determination table part 113 determines that a LAN frame having VLAN=100 or VLAN=200 is a hit. On the other hand, the frame determination table part 113 determines that a LAN frame having other VLAN values is not a hit (no-hit) and obtains "discard" data from the readout data.

The access control part 112 obtains the readout data from the frame determination table part 113 and transmits the readout data to the access control part 114 together with the LAN frame. The access control part 114 extracts the $129^{th}$ bit to the $160^{th}$ bit of data from the LAN frame and adds one bit of valid "A" data (A=1) and the MEP flag obtained from the frame determination table part 113 to the extracted data and sends the extracted data with the added data to the OAM determination table part 115 as search data.

In this embodiment, a necessary area of an OAM frame of a LAN frame is directly extracted and transmitted to the OAM determination table part 115 as search data. The OAM determination table part 115 determines that the LAN frame as a hit when the LAN frame has a VLAN value of VLAN=100 or VLAN=200 and has an OAM frame with a matching MEL, V, OPC. In the case where the OAM determination table part 115 determines the LAN frame as a hit, the OAM determination table part 115 reads out corresponding readout data from the OAM determination table.

The access control part 114 obtains the readout data from the OAM determination table part 115 and transmits the obtained readout data to the selecting part 116 together with the LAN frame and the readout data obtained from the frame determination table part 113.

In a case where the OAM determination table part 115 determines that the LAN frame is not a hit (no-hit), the readout data corresponding to the LAN frame indicates "OAM=0" and "Discard=0 (do not discard)". The selecting part 116 determines whether the LAN frame is to be processed as an OAM frame, a non-OAM frame, or a discard frame according to the readout data obtained from the frame determination table part 113 and the OAM determination table part 115 and transfers the LAN frame according to the determination result. For example, in a case where the LAN frame received by an endpoint communication apparatus is determined as an E-OAM frame (e.g., CC message), the LAN frame is transferred from the selecting part 116 to the OAM terminating part 117 and is terminated in the OAM terminating part 117.

With the above-described embodiment of the communication apparatus 100, since the frame determination table part 113 is configured to only perform determination (search) on the VLAN frame of the LAN frame and set an MEP flag for the readout data, it can be determined whether a corresponding VLAN is set with OAM. Further, since the communication apparatus 100 is provided with the OAM determination table part 115, only VLAN frames set with OAM are subject to determination of OAM.

Therefore, only necessary VLANs are registered in the frame determination table of the frame determination table part 113. Further, only entries including OAM messages are registered in the OAM determination table of the OAM determination table part 115. Accordingly, the number of entries necessary for the memory (CAM) of the frame determination table part 113 and the OAM determination table part 115 of the communication apparatus 100 can be significantly reduced.

For example, in a case where the number of necessary VLANs is indicated as "m" and the number of OAM messages (number of OAM frames) is indicated as "n", the number of entries required for the frame determination table of the frame determination table part 13 of the related art example would be "m×n". In this embodiment, the number of entries required for the frame determination table of the frame determination table part 113 is "m" and the number of entries required for the OAM determination table of the OAM determination table part 115 is "n". Thus, the number of necessary entries of the CAM can be significantly reduced.

Further, the length of the search data of the frame determination table of the frame determination table part 113 can be reduced from 161 bits (length of search data of related art example) to 129 bits. Thus, the overall memory size of the CAM of the frame determination table 113 can be significantly reduced both in a vertical direction (direction in which entries are arranged) and a horizontal direction (direction in which bit data are arranged). Accordingly, in a case where the communication apparatus 100 accommodates a large number of VLANs, OAM can be set with respect to each VLAN (VLAN units).

[Second Embodiment]

FIG. 7 illustrates a configuration of an entry of a frame determination table of the frame determination table part 113 according to a second embodiment of the present invention. In FIG. 7, the numerals in the parentheses indicate the number of bits.

In the first embodiment, the MEP function is set in the communication apparatus 100 with an E-OAM frame including, for example, a CC message. In the second embodiment, the MIP function is set in the communication apparatus 100 with an E-OAM frame including, for example, an LB message.

FIG. 8 illustrates a configuration of an entry of an OAM determination table of the OAM determination table part 115 according to the second embodiment of the present invention. In FIG. 8, the numerals in the parentheses indicate the number of bits. The OAM determination table of FIG. 8 has an MIP flag included in the readout data instead of an MEP flag. The MIP flag is an identifier for indicating an Intermediate Point of a Maintenance Entity Group. The MIP flag is set as "1" with respect to an entry corresponding to a VLAN frame for indicating that the MIP is valid. The MIP is valid where the VLAN tag=100 but is invalid where the VLAN tag=200. Further, in the OAM determination table of FIG. 8, the MIP flag is included in the registered search data.

With the second embodiment, the type of OAM can be determined (OAM type determination) with respect to MIP included in an E-OAM frame in VLAN units.

[Third Embodiment]

Figure 9:
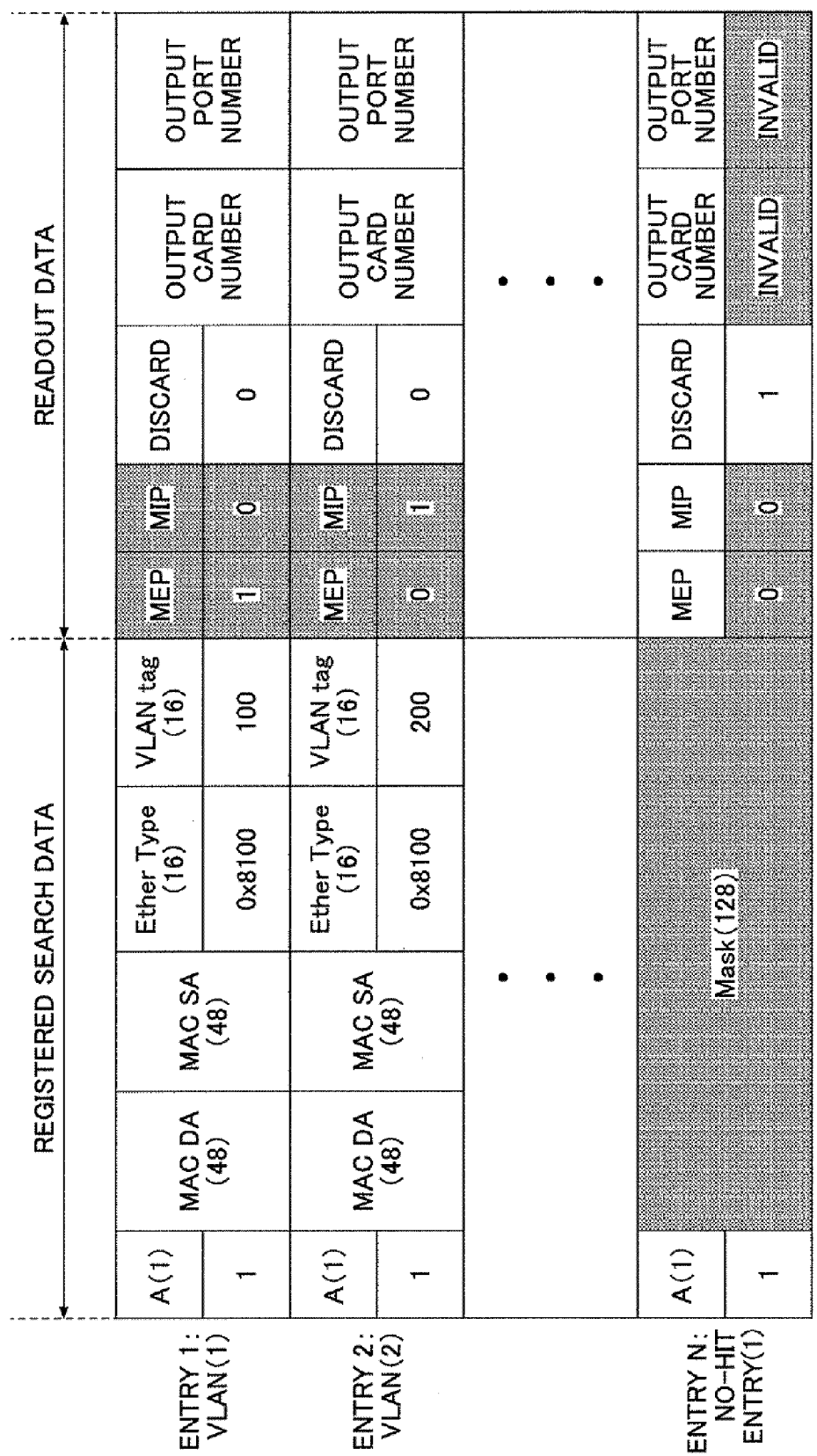
FIG. 9 illustrates a configuration of an entry of a frame determination table of a frame determination table part according to a third embodiment of the present invention.

FIG. 9 illustrates a configuration of an entry of a frame determination table of the frame determination table part 113 according to a third embodiment of the present invention. In FIG. 9, the numerals in the parentheses indicate the number of bits. In the third embodiment, both the MEP function and the MIP function can be set in the communication apparatus 100. As illustrated in FIG. 9, the frame determination table of the frame determination table part 113 has both an MEP flag and an MIP flag included in the readout data. With respect to an entry corresponding to a VLAN frame including MEP data or MIP data, the MEP flag is set as "1" or the MIP flag is set as "1". In the entry of FIG. 9, the MEP is valid where the VLAN tag=100 and the MIP is valid where the VLAN tag=200.

FIG. 10 illustrates a configuration of an entry of an OAM determination table of the OAM determination table part 115 according to the third embodiment of the present invention. In FIG. 10, the numerals in the parentheses indicate the number of bits. The OAM determination table of FIG. 10 has an MEP flag and an MIP flag. In order to match (hit) the MEP=1 and MIP=1, respectively, two entries are set in the OAM message type in the registered search data in which one is an entry of "MEP=1 and MIP=Mask (invalid)" and the other is an entry of "MEP=Mask (invalid) and MIP=1".

In this embodiment, the access control part 114 adds MEP flag data and MIP flag data to the data extracted from the LAN frame and transmits the extracted data added with the MEP flag data and MIP flag data to the OAM determination table part 115.

With the third embodiment, the type of OAM can be determined (OAM type determination) with respect to MEP and MIP included in an E-OAM frame in VLAN units.

[Fourth Embodiment]

FIG. 11 illustrates a configuration of an entry of a frame determination table of the frame determination table part 113 according to a fourth embodiment of the present invention. In FIG. 11, the numerals in the parentheses indicate the number of bits. FIG. 12 illustrates a configuration of an entry of an OAM determination table of the OAM determination table part 115 according to the fourth embodiment of the present invention. In FIG. 12, the numerals in the parentheses indicate the number of bits.

Although various messages are set in an E-OAM frame, some E-OAM frames in a network may not be set (defined) with a message. In the fourth embodiment, undefined E-OAM frames on the network are detected and discarded.

In the first-third embodiments, LAN frames which do not match (hit) are not discarded but instead transferred to another interface card 110 via the Switch card 120 according to data of the output card number and the output port number obtained from the frame determination table part 113.

In the fourth embodiment, an undefined OAM entry is added to Entry N-1 of the OAM determination table part 115 of FIG. 12. This entry including "MEP=1" and "MIP=Mask" indicates that the MEP is to search for undefined OAM entries. Further, since "MEL", "V", and "OPC" are masked, the LAN frame includes only Ether Type data and does not hit high order entries in the OAM determination table but hits entries subsequent to the high order entries. Further, since this entry includes "discard=1", the LAN frame corresponding to this entry is discarded.

With the fourth embodiment, undefined E-OAM frames in the network can be discarded by the communication apparatus 100 serving as an endpoint (MEP). This prevents unnecessary frames from being transferred in the network.

[Fifth Embodiment]

Figure 13:
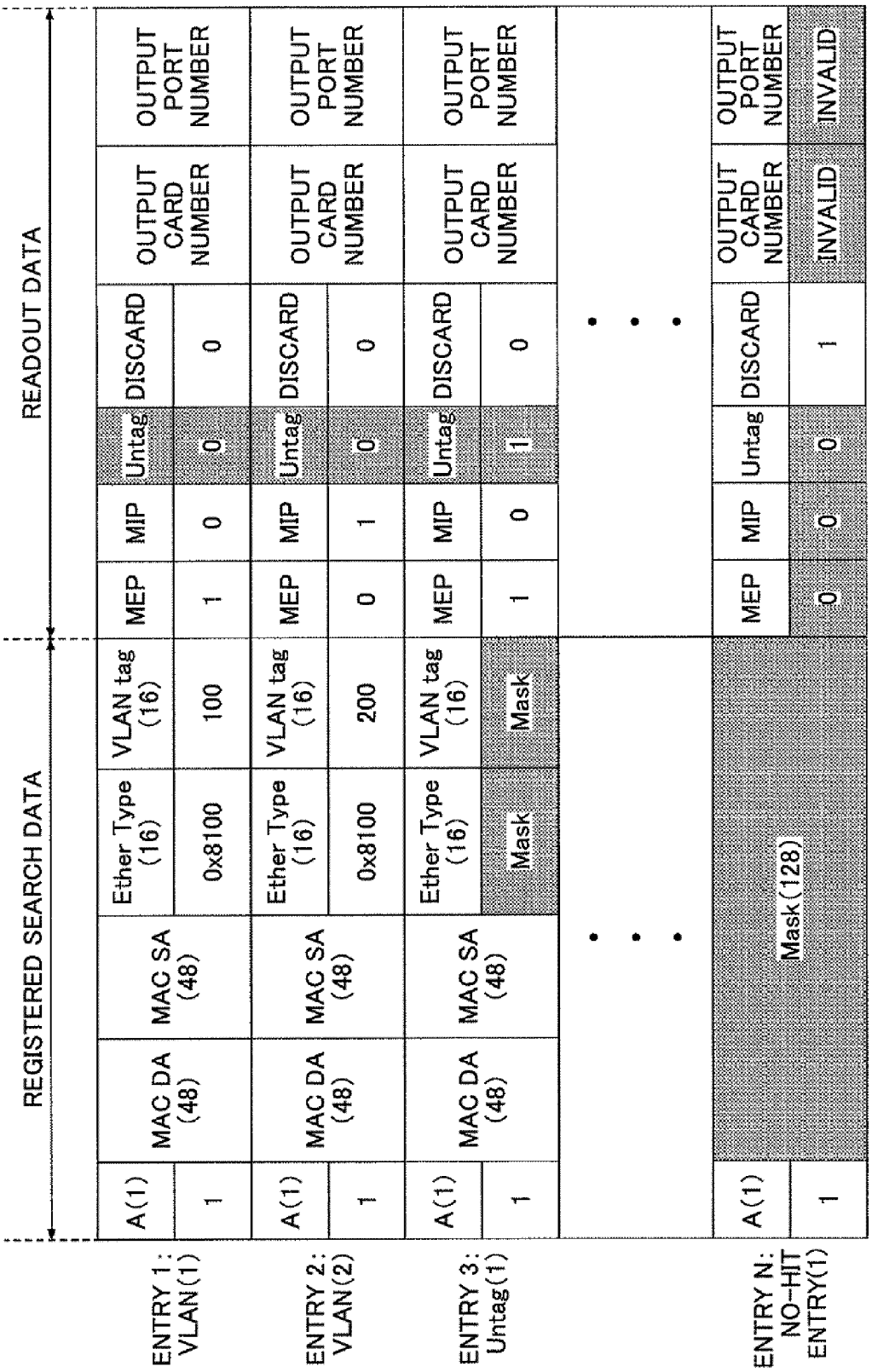
FIG. 13 illustrates a configuration of an entry of a frame determination table of a frame determination table part according to a fifth embodiment of the present invention.

FIG. 13 illustrates a configuration of an entry of a frame determination table of the frame determination table part 113 according to a fifth embodiment of the present invention. In FIG. 13, the numerals in the parentheses indicate the number of bits. FIG. 14 illustrates a configuration of an entry of an OAM determination table of the OAM determination table part 115 according to the fifth embodiment of the present invention. In FIG. 14, the numerals in the parentheses indicate the number of bits.

Typically, a LAN frame having no VLAN tag is referred to as an Untag (No-tag) frame. In the fifth embodiment, other than determining LAN frames with VLAN tags attached, the communication apparatus 100 according to this embodiment can determine whether the LAN frame is an untag frame and determine whether the untag frame has an OAM frame.

As illustrated in FIG. 13, an untag entry is added to Entry 3 of the frame determination table of the frame determination table part 113. In this untag entry, the Ether type data and VLAN tag data of the registered search data are masked. Accordingly, a LAN frame corresponding to the untag entry (i.e. Lan frame having an Ether Type=0×9100 and having no VLAN tag) does not hit high order entries in the OAM determination table but hits entries subsequent to the high order entries.

Further, an untag flag indicating that the LAN frame hits (matches) the untag entry is added to the readout data of the frame determination table of the frame determination table part 113. In a case where the LAN frame matches an untag entry, the untag flag is set as "1". This is because the starting position of the OAM frame is different from that in a VLAN frame due to the untag frame having no VLAN tag.

In the fifth embodiment, the access control part 114 inspects the value of the untag flag obtained from the frame determination table 113. In a case where "untag=1", the access control part 114 extracts the $97^{th}$ bit to the $128^{th}$ bit of data from the LAN frame and transmits the extracted data as search data to the OAM determination table part 115. In a case where "untag=0", the access control part 114, knowing that the LAN frame includes a VLAN tag, extracts the $129^{th}$ bit to the $160^{th}$ bit of data from the LAN frame and transmits the extracted data as search data to the OAM determination table part 115.

With the fifth embodiment, an untag frame and an E-OAM frame in the untag frame can be determined.

[Sixth Embodiment]

FIG. 15 illustrates a configuration of an entry of a frame determination table of the frame determination table part 113 according to a sixth embodiment of the present invention. In FIG. 15, the numerals in the parentheses indicate the number of bits. FIG. 16 illustrates a configuration of an entry of an OAM determination table of the OAM determination table part 115 according to the sixth embodiment of the present invention. In FIG. 16, the numerals in the parentheses indicate the number of bits.

A LAN frame can be transmitted having plural levels (steps) of VLAN tags. Recent communication apparatuses are equipped with this transmitting function.

Accordingly, the communication apparatus 100 according to the sixth embodiment can determine a LAN frame having plural levels of VLAN tags, determine an untag frame (LAN frame having no VLAN tag), and also determine the E-OAM frame in the LAN frame having plural levels of VLAN tags and the untag frame. As illustrated in FIG. 15, the width of the registered search data is expanded. Further, two levels of VLAN tags are provided in the registered search data so that VLAN tag is determined in two levels (steps).

The access control part 112 extracts the first bit to the $160^{th}$ bit of data from the LAN frame and transmits the extracted data to the frame determination table part 113. Then, a Tag bit is added to the readout data obtained from the frame determination table part 113. The tag bit indicates the number of levels (steps) of the VLAN tag. In a case where the LAN frame is an untag frame, the readout data indicates that "Tag=0". In a case where the LAN frame data includes a single level VLAN tag, the readout data indicates that "Tag=1". In a case where the LAN frame data includes a two level VLAN tag, the readout data indicates that "Tag=2".

In the sixth embodiment, the access control part 114 inspects the value of the tag bit obtained from the frame determination table part 113, determines the starting position of the OAM frame according to the number of levels of VLAN tags, and extracts the first bit at the starting position to the $32^{nd}$ bit of data from the LAN frame, and transmits the extracted data as search data to the OAM determination table part 115.

With the sixth embodiment, determination of a LAN frame having plural levels of VLAN tags, determination of an untag frame (LAN frame having no VLAN tag), and determination of the E-OAM frame in the LAN frame having plural levels of VLAN tags and the untag frame can be performed.

[Seventh Embodiment]

Figure 18:
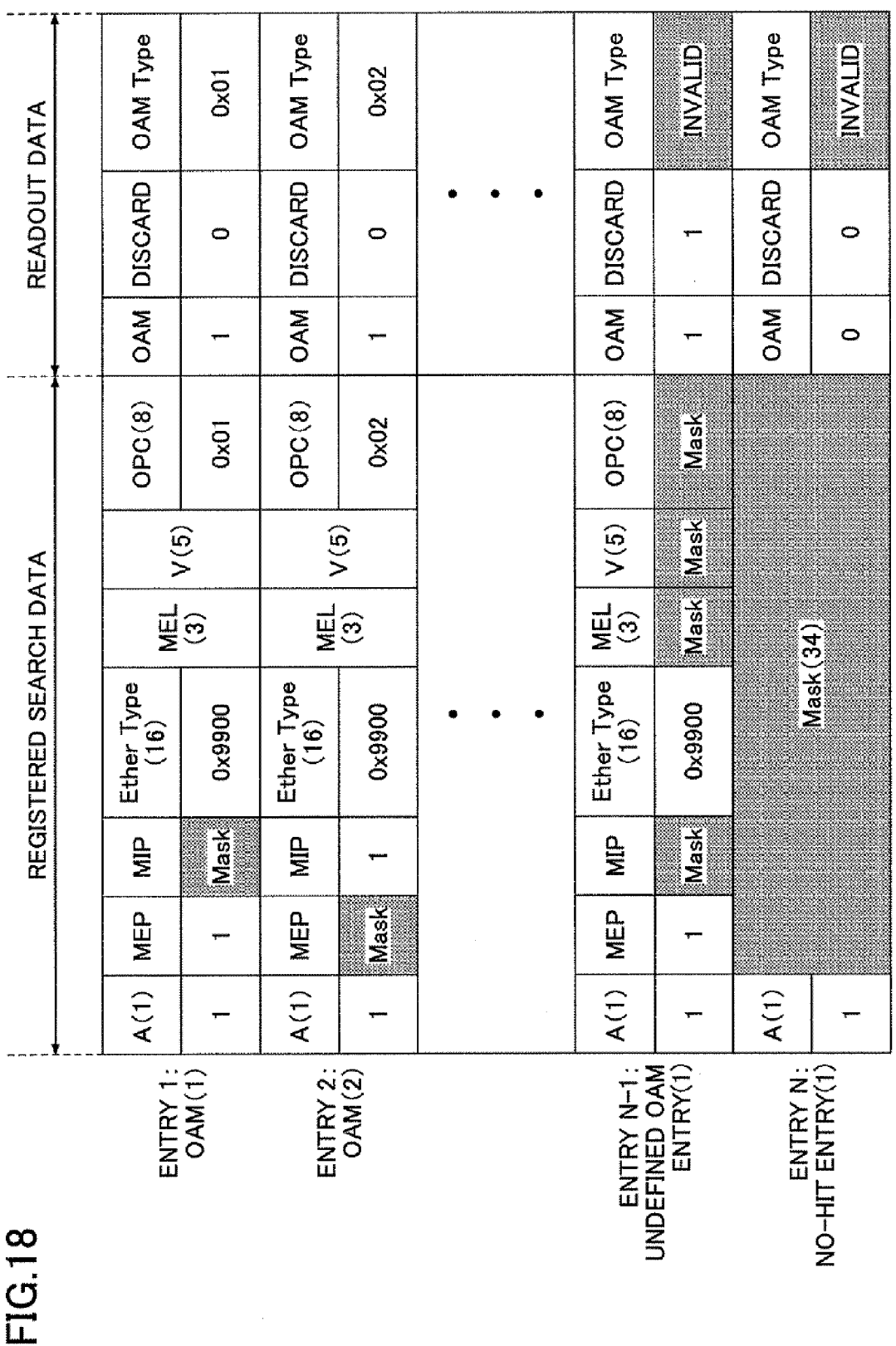
FIG. 18 illustrates a configuration of an entry of an OAM determination table of an OAM determination table part 115 according to the seventh embodiment of the present invention.

FIG. 17 illustrates a configuration of an entry of a frame determination table of the frame determination table part 113 according to a seventh embodiment of the present invention. In FIG. 17, the numerals in the parentheses indicate the number of bits. FIG. 18 illustrates a configuration of an entry of an OAM determination table of the OAM determination table part 115 according to the seventh embodiment of the present invention. In FIG. 18, the numerals in the parentheses indicate the number of bits.

In the seventh embodiment, the interface card 110 includes plural line installing ports for connecting plural lines so that different services can be accommodated with each of the line installing ports. In this case, the frame determination table part 113 determines whether to discard a LAN frame by determining whether the LAN frame has a format that is not permitted by the line installing port.

As illustrated in the frame determination table part 113 of FIG. 17, a port tag (bit) is included in the registered search data. The bit length of the port tag differs depending on the number of ports provided in the interface card 110. In this embodiment, entries 1 and 2 correspond to port 1. Further, entry 1 is registered including a two-level VLAN tag, and entry 2 is registered including an untag. Entries 3 and 4 correspond to port 2. Further, entry 3 is registered including a single level VLAN tag, and entry 4 is registered including an untag.

The discard flag of the readout data corresponding to entry 2 is indicated "0 (do not discard)" whereas the discard flag of the readout data corresponding to the entry 4 is indicated as "1 (discard)". This indicates that port 1 permits a service allowing an untag frame to transmit therethrough and port 2 does not permit (discards) a service allowing an untag frame to transmit therethrough.

With the seventh embodiment, by adding a port tag to the registered search data, determination of services with respect to each port and determination of the E-OAM frame corresponding to each port can be performed.

[Eighth Embodiment]

FIG. 19 illustrates a configuration of an entry of a frame determination table of the frame determination table part 113 according to an eighth embodiment of the present invention. In FIG. 19, the numerals in the parentheses indicate the number of bits. FIG. 20 illustrates a configuration of an entry of an OAM determination table of the OAM determination table part 115 according to the eighth embodiment of the present invention. In FIG. 20, the numerals in the parentheses indicate the number of bits.

According to the eighth embodiment, in a case where the frame determination table part 113 or the OAM determination table part 115 determines that a LAN frame be discarded, the factor in which the LAN frame is discarded (discard factor) is identified. Accordingly, as illustrated in FIGS. 19 and 20, a discard factor bit is added to the readout data of the frame determination table and the readout data of the OAM determination table, respectively.

According to the content of the discard factor, a different value is set in the entries of the tables in the frame determination table part 113 and the OAM determination table part 115. In this embodiment, "discard factor=0" indicates not to discard the LAN frame, "discard factor=1" indicates to discard the LAN frame because the LAN frame is determined as an untag frame according to the frame determination table part 113, "discard factor=2" indicates to discard the LAN frame because there is no hit (match) corresponding to the LAN frame according to the frame determination table part 113, and "discard factor=3" indicates to discard the LAN frame because the LNA frame is determined as an undefined frame according to the OAM determination table part 115.

Each discard factor can be read out by the control terminal 140 by using control signals via the CPU card 130. By setting the discard factor bits in the readout data, the factor in which the LAN frame is discarded can be identified. Accordingly, the discard factor can be reported to the maintenance or managing entity and allow the maintenance or managing entity to understand the reason that the LAN frame is discarded.

[Ninth Embodiment]

Figure 21:
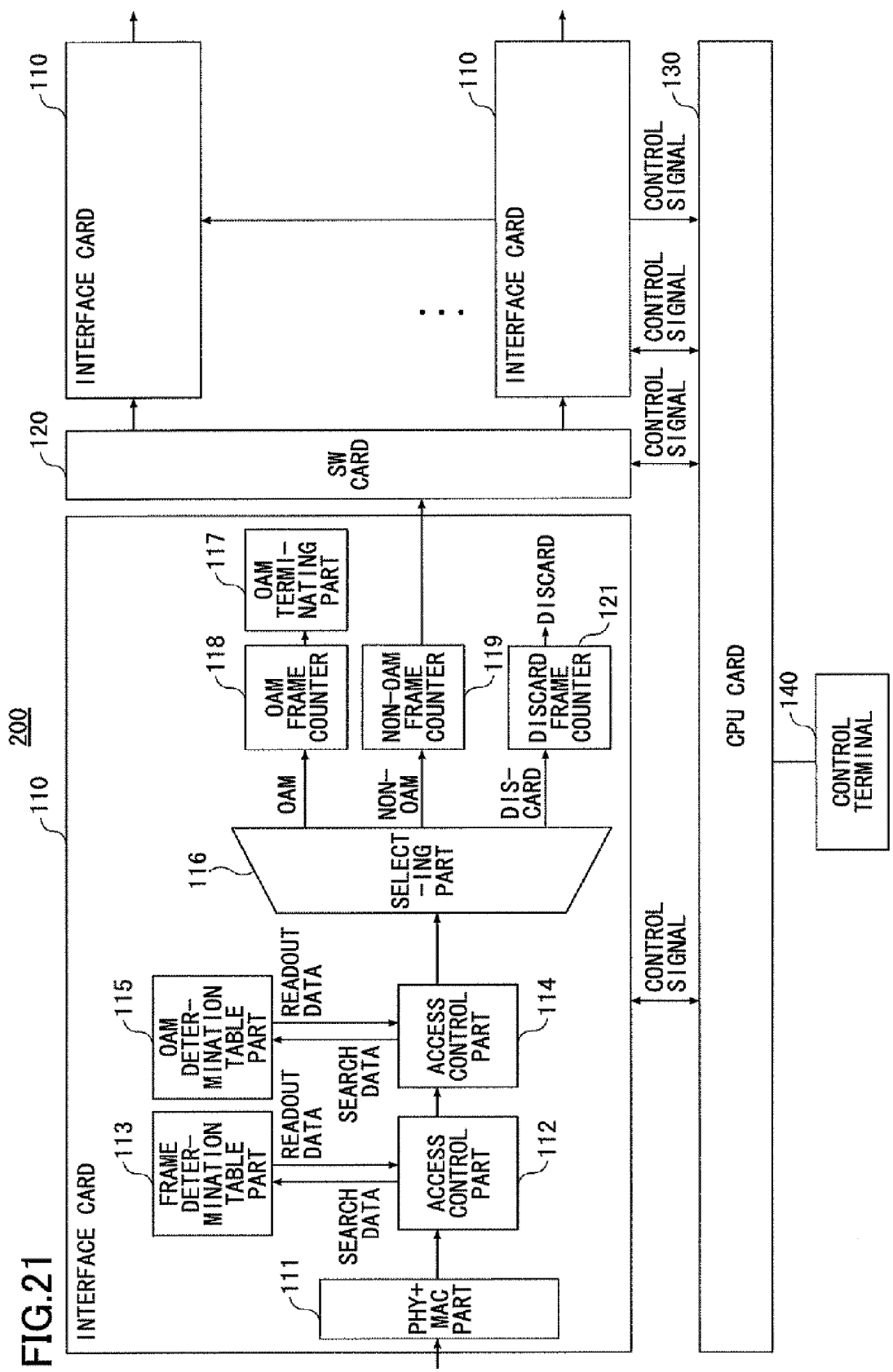
FIG. 21 is a schematic diagram of a communication apparatus according to a ninth embodiment of the present invention.

FIG. 21 is a schematic diagram of a communication apparatus 200 according to a ninth embodiment of the present invention. In the ninth embodiment, frame counters (OAM frame counter, non-OAM frame counter, discard frame counter) 118, 119, 121 are provided to the communication apparatus 200 for counting the number of LAN frames that have been subjected to a determination process by each of the frame determination table part 113 and the OAM determination table part 115.

The frame counters 118, 119, 121 are provided behind the selecting part 116 so that LAN frames can be counted after the process that should be performed on each of the LAN frames is determined by the selecting part 116.

The OAM frame counter 118 counts the number of LAN frames determined as OAM frames by the OAM determination table part 115 (number of LAN frames to be processed by the OAM terminating part 117). The non-OAM frame counter 119 counts the number of LAN frames determined as non-OAM frames by the OAM determination table part 115 (number of LAN frames to be transmitted to the Switch card 120). The discard frame counter 121 counts the number of LAN frames determined to be discarded by the frame determination table part 113 and the OAM determination table part 115 (number of LAN frames to be discarded).

In a case where plural discard frame counters are provided, each discard frame counter may be provided for a corresponding discard factor. Further, each of the frame counters 118, 119, 120 can have data read out by using control signals from the control terminal 140 via the CPU card 130.

With the ninth embodiment, the frequency in which the LAN frames are processed can be determined by referring to the number of frames processed by corresponding parts (e.g., OAM terminating part 117) in the interface card 110. Further, it can be determined whether an appropriate number of LAN frames have been processed during a test or during evaluation.

[Tenth Embodiment]

Figure 22:
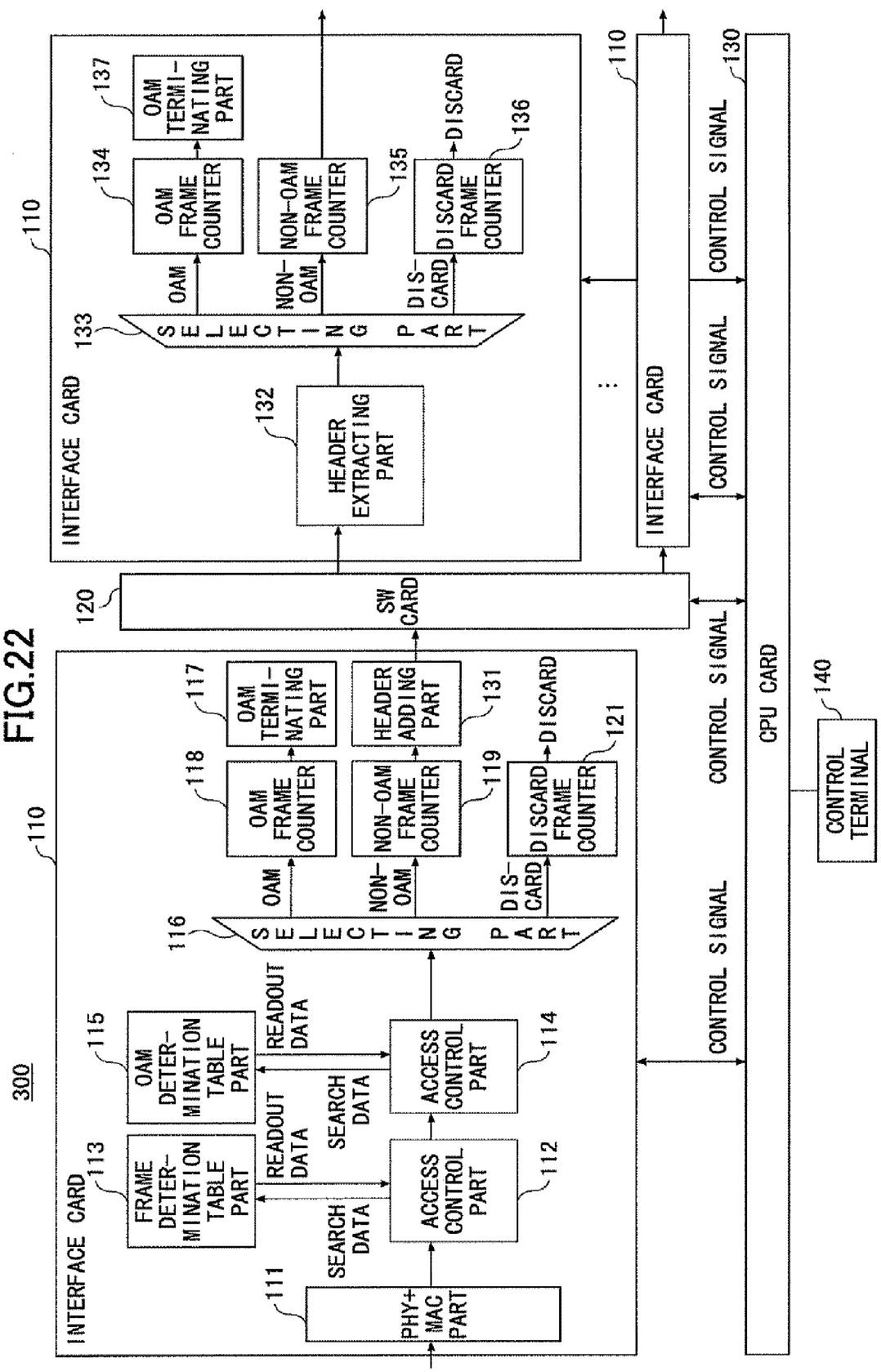
FIG. 22 is a schematic diagram of a communication apparatus according to a tenth embodiment of the present invention.

FIG. 22 is a schematic diagram of a communication apparatus 300 according to a tenth embodiment of the present invention. FIG. 23 illustrates a configuration of an entry of a frame determination table of the frame determination table part 113 according to the tenth embodiment of the present invention. In FIG. 23, the numerals in the parentheses indicate the number of bits. FIG. 24 illustrates a configuration of an entry of an OAM determination table of the OAM determination table part 115 according to the tenth embodiment of the present invention. In FIG. 24, the numerals in the parentheses indicate the number of bits.

In the tenth embodiment, not only the interface card 110 provided at the input side (hereinafter also referred to as "input side interface card 110") allows termination of E-OAM frames but also the interface card 110 provided at the output side (hereinafter also referred to as "output side interface card 110") allows termination of E-OAM frames. Normally, the status of a network between communication apparatuses can be monitored by terminating E-OAM frames in the input side interface card 110.

However, in a case where a failure occurs in the switch card 120 or in a signal transmission line(s) provided between, for example, the interface cards 110 of the communication apparatus 100, monitoring using E-OAM frames cannot be satisfactorily performed because the E-OAM frames terminate at the interface card 110 provided at the input side.

Accordingly, in this embodiment, the interface card 110 provided at the output side is also provided with an E-OAM frame terminating function. Further, as illustrated in FIG. 23, a bypass (BP) flag is added to the frame determination table of the frame determination table part 113. In a case where the BP flag is "1", the E-OAM frame does not terminate in the input side interface card 110 even if the OAM determination table part 115 determines that the E-OAM frame is to terminate in the input side interface card 110. In this case, instead of terminating at the input side interface card 110, the E-OAM frame (LAN frame) is transmitted to the output side interface card 110 by the selecting part 116.

When transmitting the E-OAM frame to the output side interface card 110, a header adding part 131 not only adds data of the output card number and the output port number included in the readout data obtained from the frame determination table part 113 but also adds a tag flag, data of the OAM flag and the OAM Type included in the readout data obtained from the OAM determination table part 115 to the E-OAM frame as a header. Further, in a case where the LAN frame is not an E-OAM frame, data of the tag flag, the OAM flag, and the OAM type added to the header of the LAN frame are set as "0".

In the output side interface card 110, a header extracting part 132 extracts the data included in the header (header data) from the LAN frame and transfers the header data and the LAN frame to a selecting part 133 provided behind the header extracting part 132. The selecting part 133 inspects the header data, determines that the LAN frame is an E-OAM frame if the OAM frame is "1", and transmits the E-OAM frame to an OAM terminating part 137.

As described above, even in a case where an E-OAM frame is primarily set to terminate at the input side interface card 110, the E-OAM frame can be used to monitor the communications status between the input side interface card 110 and the output side interface card 110 and the communication status of the switch card 120 by terminating the E-OAM frame at the output side interface card 110.

[Eleventh Embodiment]

Figure 25:
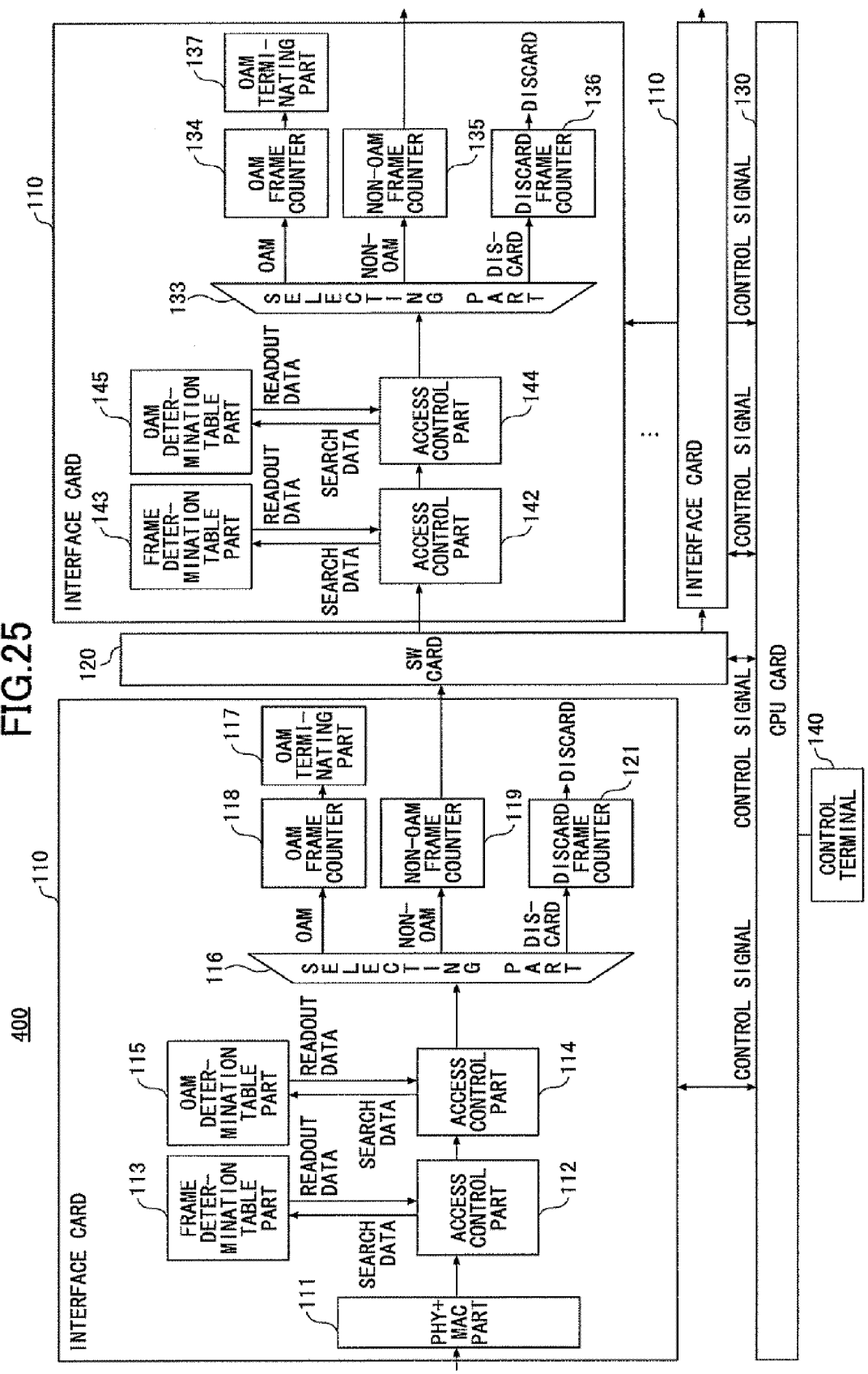
FIG. 25 is a schematic diagram of a communication apparatus according to an eleventh embodiment of the present invention.

FIG. 25 is a schematic diagram of a communication apparatus 400 according to an eleventh embodiment of the present invention. In the eleventh embodiment, in addition to providing the frame determination table part 113 and the OAM determination table part 115 in the input side interface card 110, a frame determination table part 143 and an OAM determination table part 145 are provided in the output side interface card 110. Thereby, E-OAM frames can also terminate in the output side interface card 110.

The MEP or the MIP of an E-OAM frame may be set in a port provided at the input side (input side port) of a communication apparatus or in a port provided at the output side (output side port) of the communication apparatus. Accordingly, E-OAM frames primarily set to terminate at the output side port can be set to terminate at the input side port of the input side interface card 110 by setting MEP data or MIP data in the input side interface card 110.

However, in order for the E-OAM frames to terminate at the input side interface card 110, entries corresponding to the output side port need to be added to the input side interface card 110. Therefore, in a case of a communication apparatus having many interface ports, a CAM having a large memory capacity needs to be provided in the input side interface card 110 for setting MEPs or MIPs corresponding to all of the output side ports of the communication apparatus. Such a large memory capacity, however, is not desired.

Accordingly, in the embodiment illustrated in FIG. 25, the output side interface card 110 is provided with a frame determining function and an E-OAM terminating function. An access control part 142, a frame determination table part 143, an access control part 144, and an OAM determination table part 145 have substantially the same configuration as the access control part 112, frame determination table part 113, the access control part 114, and the OAM determination table 115, respectively.

Although the configuration of the frame determination table and the configuration of the OAM determination table illustrated in FIGS. 19 and 20 can be applied to corresponding determination tables of the frame determination table part 143 and the OAM determination table part 145, the output card number and the output port number of the frame determination table of the frame determination table part 143 of the output side interface card 110 are invalid because the output card number and the output port number are already obtained by the frame determination table part 113 of the input side interface card 110. Further, an output side port number is set in the port bits of the registered search data of the frame determination table of the frame determination table part 143 of the output side interface card 110.

As described above, by setting appropriate entries in the frame determination tables 113, 143 of the input and output interface cards 110, E-OAM frames can be terminated in the input side port or the output side port of a communication apparatus.

[Twelfth Embodiment]

Figure 26:
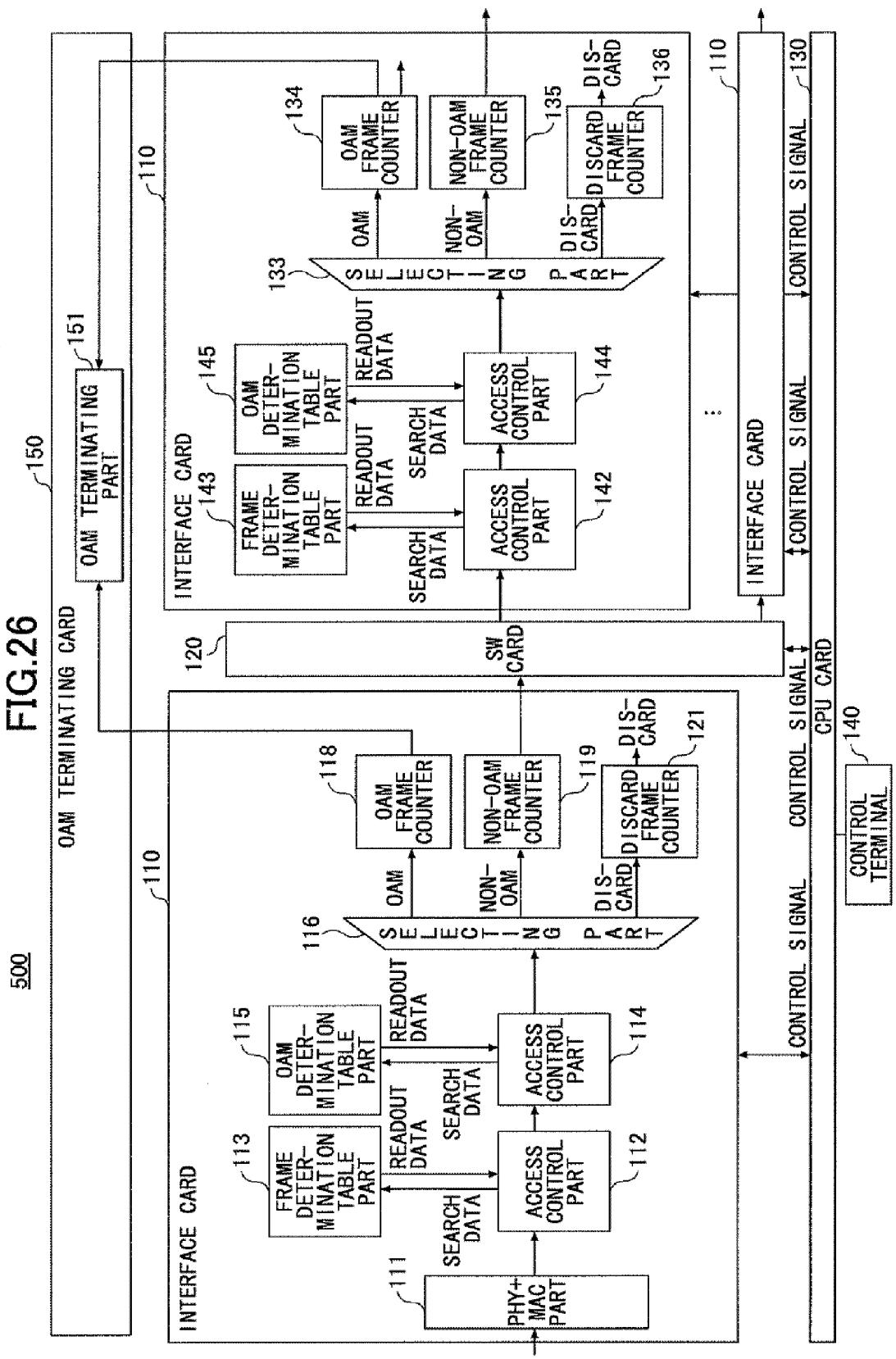
FIG. 26 is a schematic diagram of a communication apparatus according to a twelfth embodiment of the present invention.

FIG. 26 is a schematic diagram of a communication apparatus 500 according to a twelfth embodiment of the present invention. In the twelfth embodiment, E-OAM frames subjected to determination in the input side interface card 110 and the output side interface card 110 are terminated in a common (shared) portion in the communication apparatus 500 rather than being separately processed in each of the input and output side interface cards 110. That is, in the communication apparatus 500 according to the twelfth embodiment, the input side interface card 110 and the output side interface card 110 share an OAM terminating part 151.

In FIG. 26, the E-OAM frames subjected to the determination in the input side interface card 110 and the output side interface card 110 are gathered to an OAM terminating card 150 so that the E-OAM frames can be terminated at a single part of the communication apparatus 500.

The OAM terminating card 150 may be a card dedicated for terminating E-OAM frames. Alternatively, the OAM terminating card 150 may be a card having substantially the same configuration as the switch card 120 or the CPU card 130. Alternatively, instead of providing the OAM frame counters 118, 134 in the input and output side interface cards 110, the OAM frame counters 118, 134 may be provided in the OAM terminating card 150.

As described above, by gathering E-OAM frames and terminating the E-OAM frames at a single common (shared) part of the communication apparatus 500 rather than separately terminating the E-OAM frames in the input and output side interface cards 110, the circuit size of the interface card 110 and the number of components of the communication apparatus 500 can be reduced. Thereby, manufacturing cost and power consumption of the communication apparatus 500 can be reduced.

[Thirteenth Embodiment]

Figure 28:
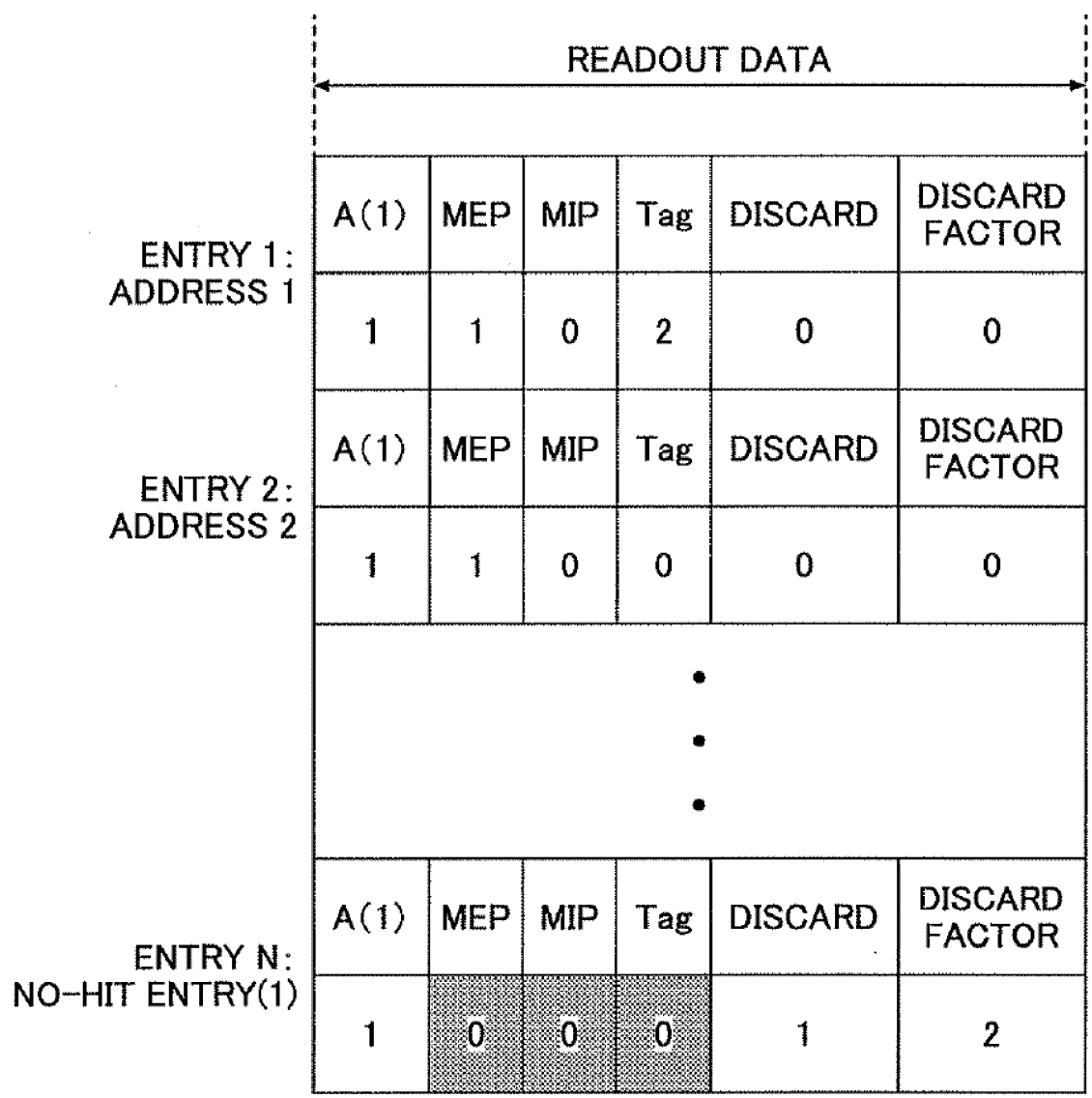
FIG. 28 illustrates a configuration of an entry of a frame determination table of a frame determination table part of an output side interface card according to a thirteenth embodiment of the present invention.

FIG. 27 illustrates a configuration of an entry of a frame determination table of the frame determination table part 113 of the input side interface card 110 according to a thirteenth embodiment of the present invention. In FIG. 27, the numerals in the parentheses indicate the number of bits. FIG. 28 illustrates a configuration of an entry of a frame determination table of the frame determination table part 143 of the output side interface card 110 according to the thirteenth embodiment of the present invention. In FIG. 28, the numerals in the parentheses indicate the number of bits.

In the frame determination table of the frame determination table part 113, a frame ID (frame identifier) is added to the readout data. After the frame determination table part 113 determines whether a LAN frame is an OAM frame, a frame ID is assigned (set) to the LAN frame. Accordingly, independent frame IDs are set in correspondence with each entry. The LAN frame together with the frame ID is transferred from the input side interface card 110 to the output side interface card 110.

In FIG. 27, the LAN frames corresponding to entries 1 and 2 are E-OAM frames desired to terminate in the output side interface card 110 instead of the input side interface card 110. Frame IDs "1" and "2" are assigned to the LAN frames corresponding to the entries 1 and 2, respectively. The LAN frames corresponding to the entries 1 and 2 are transmitted to the output side interface card 110 together with the frame IDs.

In the output side interface card 110, the frame ID is used as a memory index (memory address) for reading out (accessing) the frame determination table of the frame determination table part 143. In the frame determination table of the frame determination table part 143 in FIG. 28, the entries corresponding to the frame IDs "1" and "2" are entries 1 and 2. By directly accessing the frame determination table of the frame determination part 143 by referring to the frame IDs, readout data such as the MEP flag data or MIP flag data can be obtained.

In the thirteenth embodiment, the frame determination table part 143 is configured as an SRAM (Static Random Access Memory) instead of a CAM because there is no need to search its frame determination table.

As described above, data used in the determination by the input side interface card 110 can be utilized in the frame determination performed by the output side interface card 110. Accordingly, a less expensive SRAM can be used to fabricate the frame determination table part 143 of the output side interface card 110.

[Fourteenth Embodiment]

Figure 29:
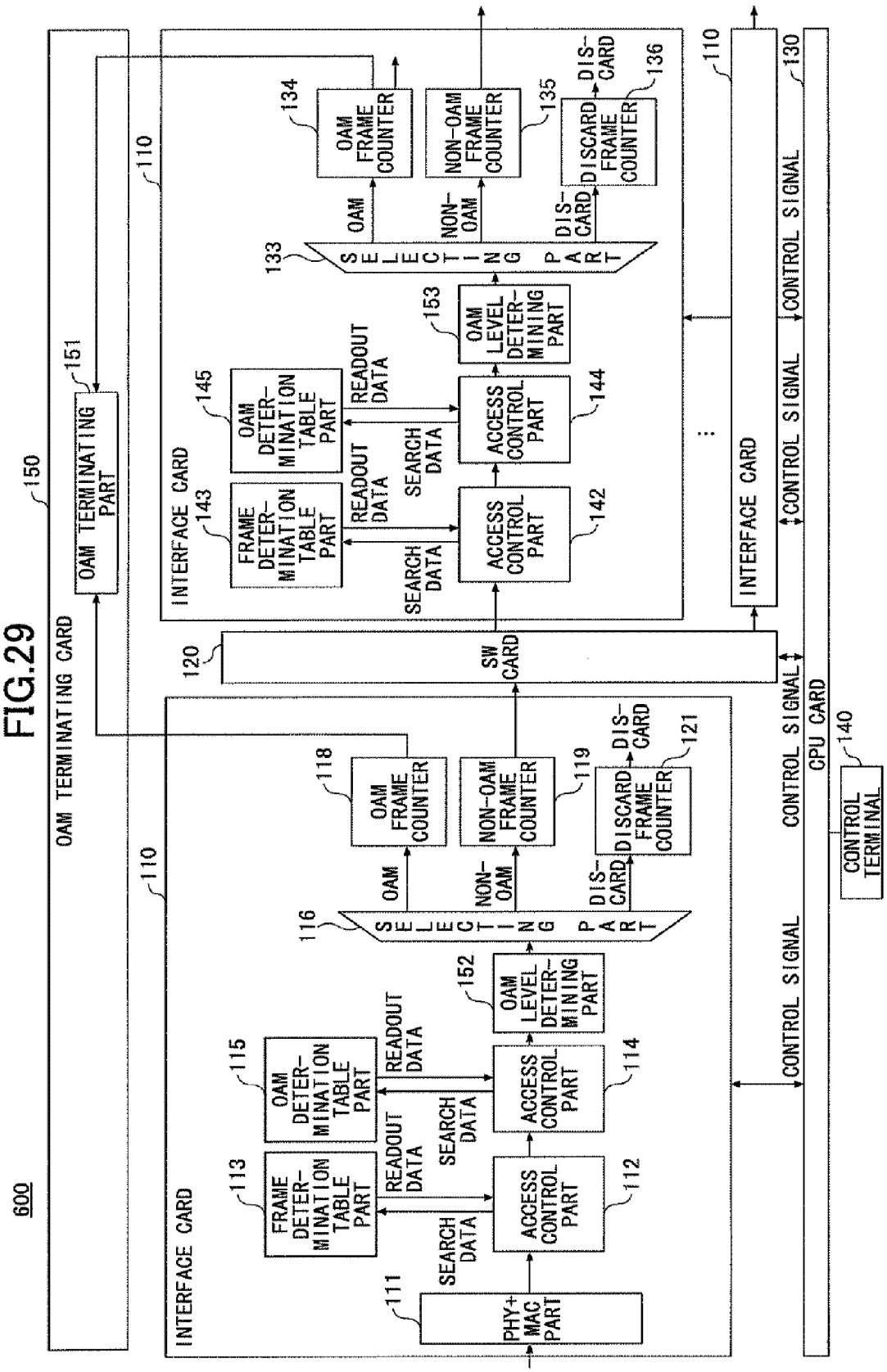
FIG. 29 is a schematic diagram of a communication apparatus according to a fourteenth embodiment of the present invention.
Figure 30:
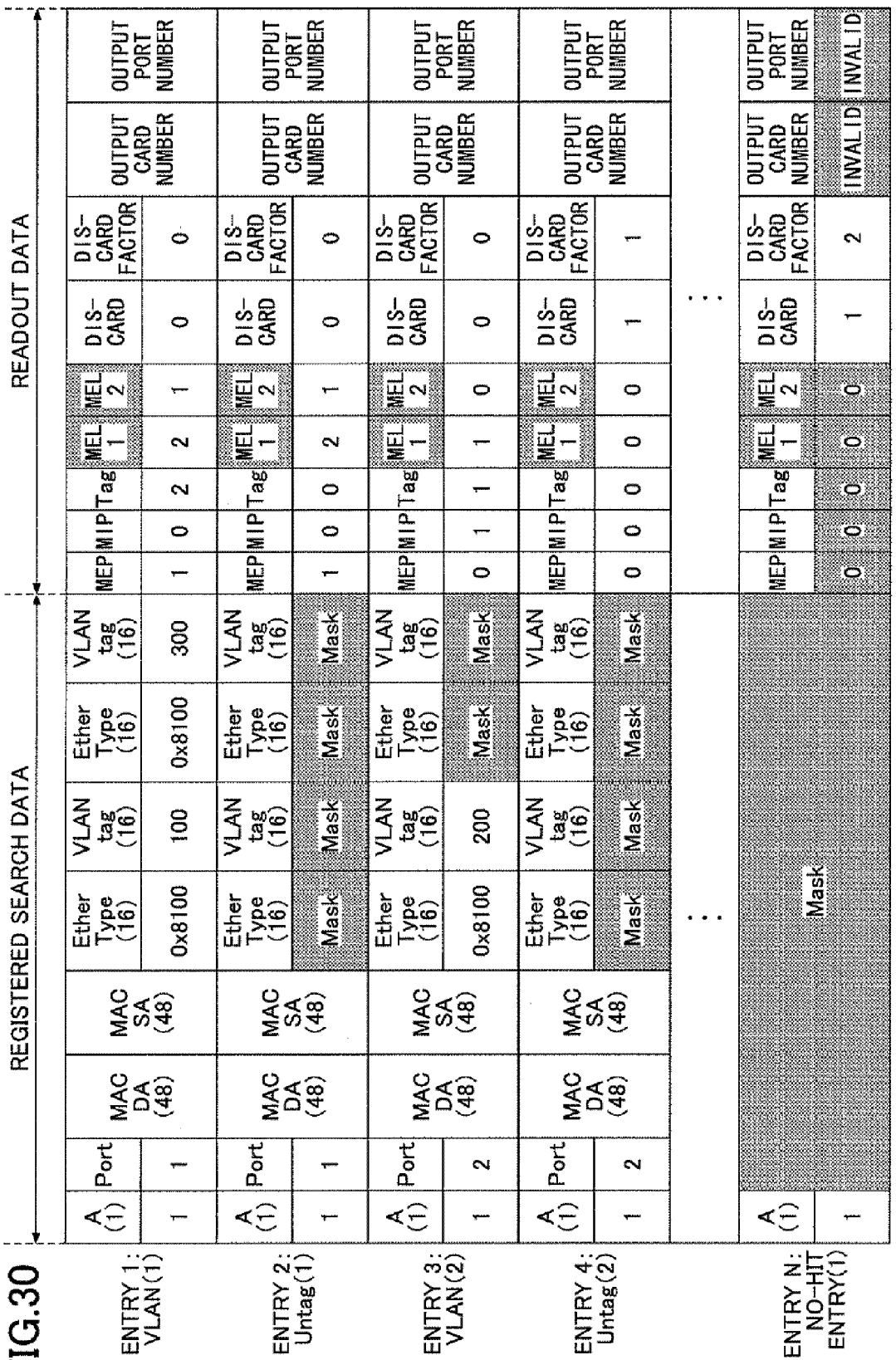
FIG. 30 illustrates a configuration of an entry of a frame determination table of frame determination table parts according to a fourteenth embodiment of the present invention.
Figure 31:
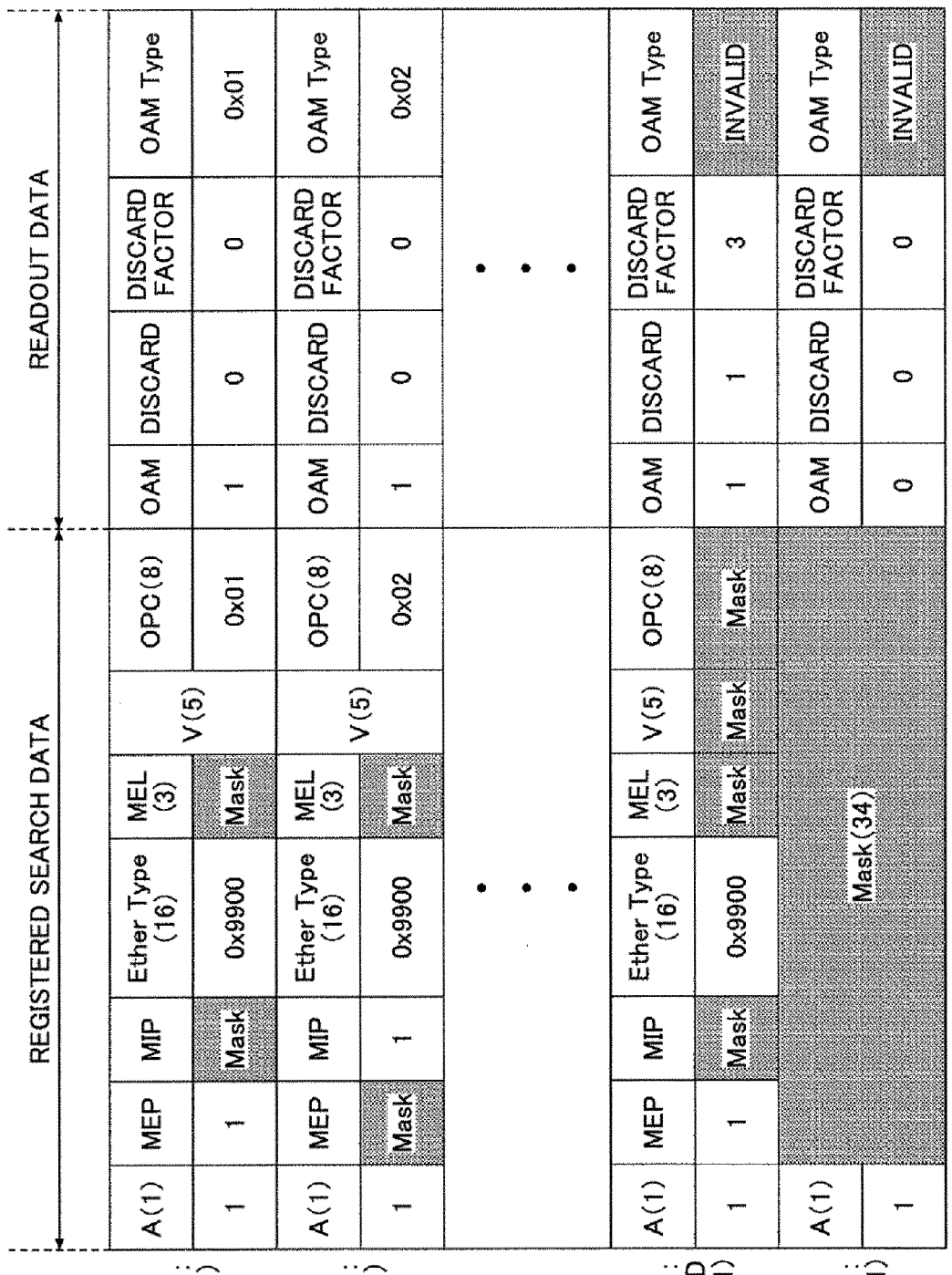
FIG. 31 illustrates a configuration of an entry of an OAM determination table of OAM determination table parts according to a fourteenth embodiment of the present invention.
Figure 32:
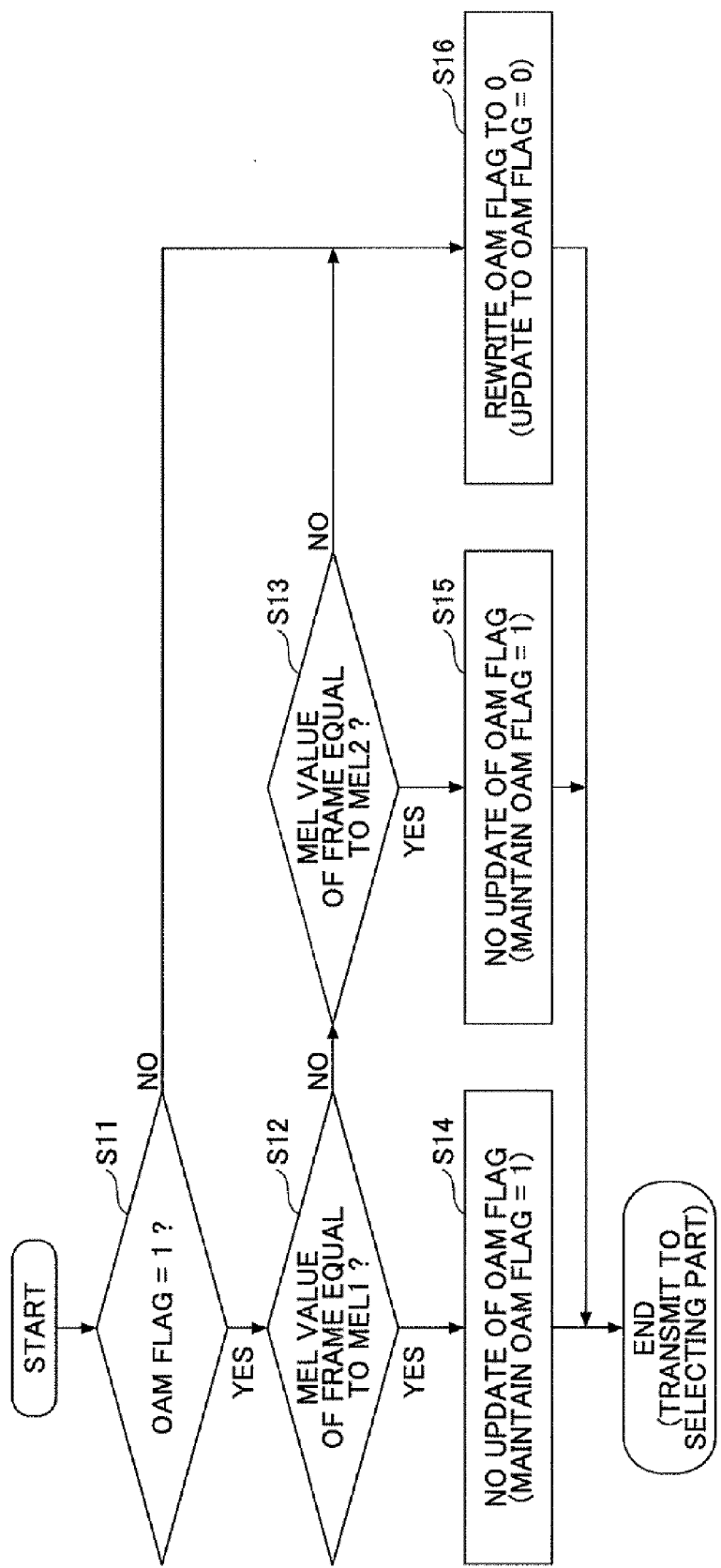
FIG. 32 is a flowchart of an OAM determination operation performed by OAM level determining parts according to a fourteenth embodiment of the present invention.

FIG. 29 is a schematic diagram of a communication apparatus 600 according to a fourteenth embodiment of the present invention. FIG. 30 illustrates a configuration of an entry of a frame determination table of the frame determination table parts 113, 143 according to the fourteenth embodiment of the present invention. In FIG. 30, the numerals in the parentheses indicate the number of bits. FIG. 31 illustrates a configuration of an entry of an OAM determination table of the OAM determination table parts 115, 145 according to the fourteenth embodiment of the present invention. In FIG. 31, the numerals in the parentheses indicate the number of bits. FIG. 32 is a flowchart of an OAM determination operation performed by OAM level determining parts 152, 153 according to the fourteenth embodiment of the present invention.

In the fourteenth embodiment, E-OAM frames of different levels are set in a single VLAN. In communicating between different communication apparatuses, a common (shared) VLAN is used for transmitting/receiving LAN frames. In some cases, it is desired to perform different monitoring operations for respective communication apparatuses. Accordingly, the level of an E-OAM message (MEL, Maintenance Entity Group Level) can be defined with different values.

In the frame determination table of the frame determination table parts 113, 143 of FIG. 30, two different levels can be set in MEL1 and MEL2. Although MEL can be set with two levels, three or more different levels may be set as the MEL by adding more data to the readout data of the frame determination table. In this embodiment, in a case where level "0" is defined as an invalid level and levels "1" and "2" are defined valid levels, "MEL1=2" and "MEL2=1" are set in entries 1 and 2, respectively. "MEL1=2" and "MEL2=1" indicate that E-OAM frames of levels 1 and 2 are to be terminated. In a case where "MEL1=1" is set in entry 3, the E-OAM frame of level 1 is to be terminated.

Further, in the OAM determination table of the OAM determination table parts 115, 145 of FIG. 31, "MEL" data of the registered search data are masked. This is because the value of MEL is not inspected by the OAM determination table parts 115, 145 when searching its OAM determination table.

As illustrated in FIG. 29, an OAM level determining part 152 is provided between the access control part 114 and the selecting part 116, and an OAM determining part 153 is provided between the access control part 144 and the selecting part 133.

In the OAM determining operation performed in the input side interface card 110 and the output side interface card 110 as illustrated in flowchart of FIG. 32, the OAM level determining part 152 (or 153) determines that the current LAN frame is an E-OAM frame when the OAM flag of the readout data obtained from the OAM determination table of the OAM determination table part 115 (or 145) is "1" (Yes in Step S11). Then, the OAM determining part 152 (or 153) compares the value of MEL in the E-OAM frame with MEL1 and/or MEL2 obtained from the frame determination table of the frame determination table part 113 (Step S12, S13).

In a case where the values of the MEL match (Yes in Step S12 or Yes in Step S13), the OAM level determining part 152 (or 153) determines that the OAM frame is to be terminated and transmits the E-OAM frame to the selecting part 116 (or 133) without rewriting the OAM flag data indicated as "1" (Step S14, S15). In a case where the values of the MEL do not match (No in both Steps S12 and S13), the OAM level determining part 152 determines that the LAN frame is not an OAM frame to be terminated, rewrites the OAM flag data from "1" to "0", and transmits the LAN frame to the selecting part 116 (or 133) (Step S16).

Then, in a case where the levels match, the selecting part 116 (or 133) transmits the LAN frame to the OAM terminating part 151. In a case where the levels do not match, the selecting part 116 (or 133) determines that the LAN frame is not an OAM frame and transmits the LAN frame to, for example, the switch card 120.

With the fourteenth embodiment, E-OAM frames of different levels can be determined and termination of the E-OAM frames can be performed in both the input side interface card 110 and the output side interface card 110.

[Fifteenth Embodiment]

Figure 33:
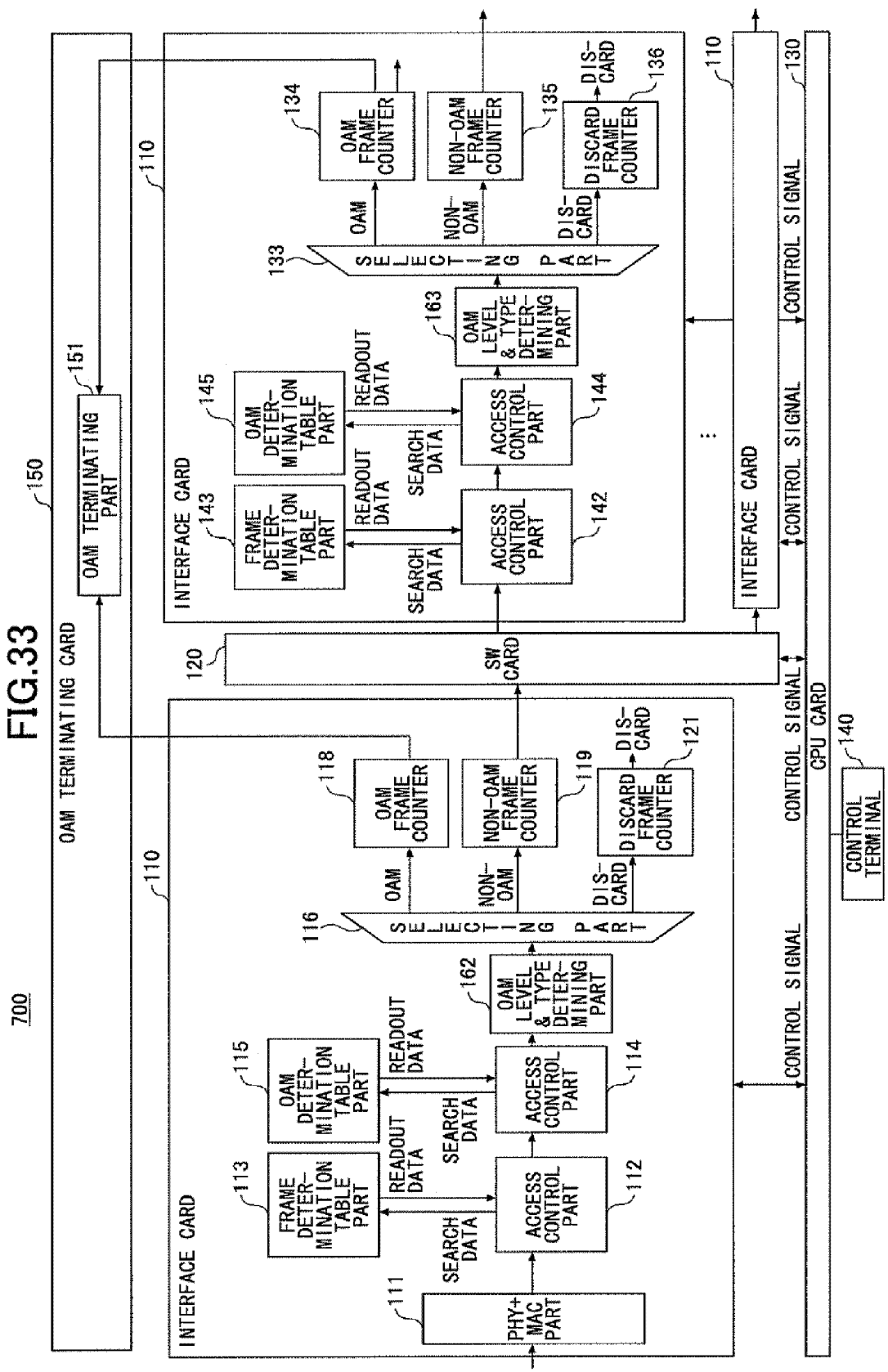
FIG. 33 is a schematic diagram of a communication apparatus according to a fifteenth embodiment of the present invention.
Figure 36:
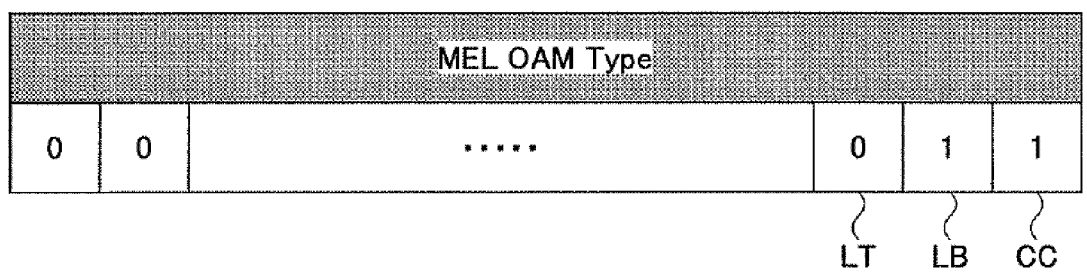
FIG. 36 illustrates an exemplary configuration of a MEL OAM Type bitmap data.
Figure 37:
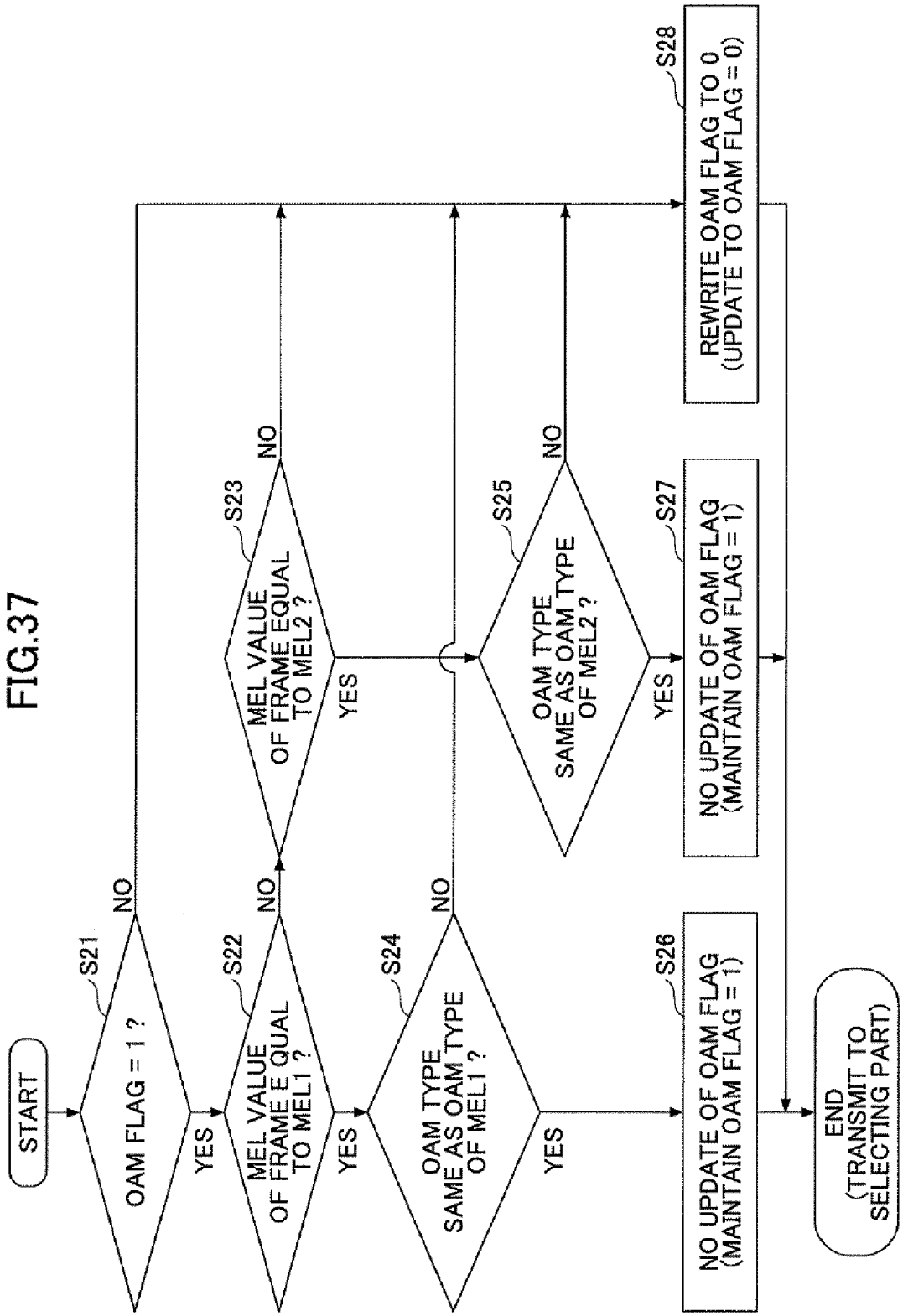
FIG. 37 is a flowchart of an OAM level & type determination operation performed by OAM level & type determining parts according to a fifteenth embodiment of the present invention.

FIG. 33 is a schematic diagram of a communication apparatus 700 according to a fifteenth embodiment of the present invention. FIG. 34 illustrates a configuration of an entry of a frame determination table of the frame determination table parts 113, 143 according to the fifteenth embodiment of the present invention. In FIG. 34, the numerals in the parentheses indicate the number of bits. FIG. 35 illustrates a configuration of an entry of an OAM determination table of the OAM determination table parts 115, 145 according to the fifteenth embodiment of the present invention. In FIG. 35, the numerals in the parentheses indicate the number of bits. FIG. 36 illustrates an exemplary configuration of a MEL OAM Type bitmap data. FIG. 37 is a flowchart of an OAM level & type determination operation performed by OAM level & type determining parts 162, 163 according to the fifteenth embodiment of the present invention.

In the fifteenth embodiment, in a case where E-OAM frames of different levels (MEL) are set to each VLAN, each type of OAM can be set with respect to the different levels of each VLAN.

In the fifteenth embodiment, instead of the OAM level determining parts 152, 153, the communication apparatus 700 of FIG. 33 is provided with OAM level & type determining parts 162, 163.

As illustrated in the frame determination tables of the frame determination table parts 113, 143 of FIG. 34, data items "MEL1 OAM Type" and "MEL2 OAM Type" are added. In this embodiment, entry 1 corresponding to VLAN (1) is set with two different levels in which one level is "MEL1" and the other level is "MEL2". Further, "MEL1 OAM Type" and "MEL2 OAM Type" indicate the type(s) of OAMs set in each of the levels. The values set in the "MEL1 OAM Type" and "MEL2 OAM Type" may indicate one or a combination of predetermined OAM types. For example, "MEL1 OAM Type=1" indicates that only OAM type "CC (Continuity Check)" is set in MEL1 whereas "MEL2 OAM Type=2" indicates that OAM types "CC" and "LB (Loop Back)" are set in MEL2.

Alternatively, as illustrated in the MEL OAM Type bit map data configuration of FIG. 36, a bit format may be prepared beforehand in which each bit indicates one type of OAM. Accordingly, an OAM type corresponding to a given bit is set in a case where the value of the given bit is "1" whereas the OAM type corresponding to the given bit is not set in a case where the value of the given bit is "0". In the example of FIG. 36, OAM types "CC" and "LB" are set whereas OAM type "LT (Link Trace)" is not set.

After determination processes are performed by the frame determination table parts 113, 143 and the OAM determination table parts 115, 145, the OAM level & type determining parts 162, 163 determine the OAM level and the OAM type of the LAN frame.

In the OAM level & OAM type determining operation as illustrated in flowchart of FIG. 37, the OAM level & type determining part 162 (or 163) determines that the current LAN frame is an E-OAM frame when the OAM flag of the readout data obtained from the OAM determination table of the OAM determination table part 115 (or 145) is "1" (Yes in Step S21). Then, the OAM level & type determining part 162 (or 163) compares the value of MEL in the E-OAM frame with MEL1 and/or MEL2 obtained from the frame determination table of the frame determination table part 113 (Step S22, S23).

In a case where the values of the MEL match (Yes in Step S22 or Yes in Step S23), the OAM level & type determining part 162 (or 163) compares the value of "MEL1 OAM Type" or the value of "MEL2 OAM Type" with the value of the OAM Type obtained from the readout data of the OAM determination table of the OAM determination table part 115 (Step S24, S25).

In a case where the values of the OAM type match (Yes in Step S24 or Yes in Step S25), the OAM level & type determining part 162 (or 163) determines that the E-OAM frame is to be terminated and transmits the E-OAM frame to the selecting part 116 (or 133) without rewriting the OAM flag data indicated as "1" (Step S26, S27). In a case where the values of the OAM type do not match (No in Step S24 or S25), the OAM level & type determining part 162 (or 163) determines that the LAN frame is not an E-OAM frame to be terminated, rewrites the OAM flag data from "1" to "0", and transmits the LAN frame to the selecting part 116 (or 133) (Step S28).

Then, in a case where the level and the OAM type match, the selecting part 116 (or 133) transmits the LAN frame to the OAM terminating part 151. In a case where the level and the OAM type do not match, the selecting part 116 (or 133) determines that the LAN frame is not an OAM frame and transmits the LAN frame to, for example, the switch card 120.

With the fifteenth embodiment, different OAM types can be set with respect to different OAM levels.

[Sixteenth Embodiment]

Figure 38:
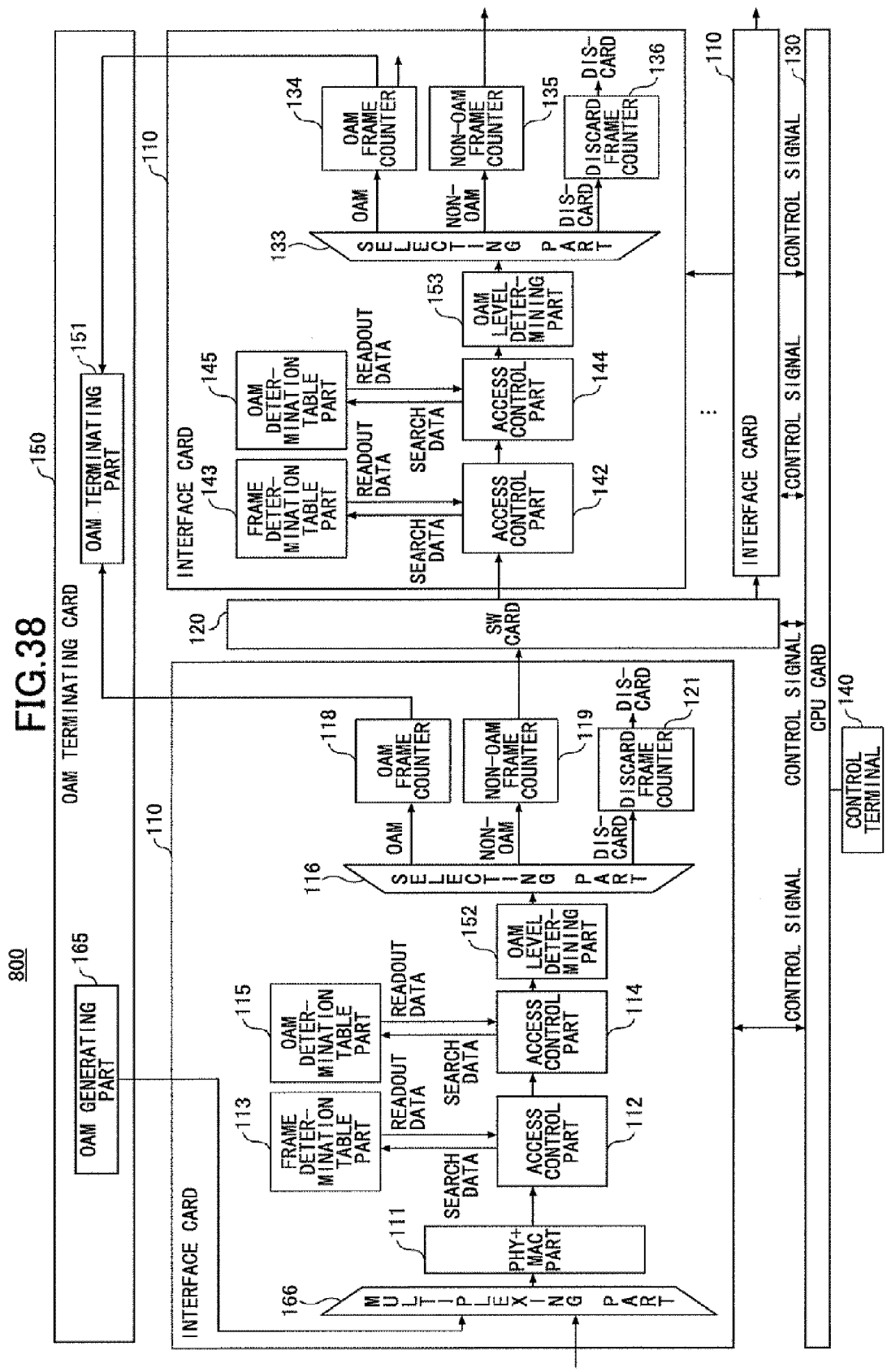
FIG. 38 is a schematic diagram of a communication apparatus according to a sixteenth embodiment of the present invention.

FIG. 38 is a schematic diagram of a communication apparatus 800 according to a sixteenth embodiment of the present invention. In the sixteenth embodiment, the communication apparatus 800 can autonomously monitor a frame path provided in the communication apparatus 800 by inserting an E-OAM frame from the input side interface card 110 and extracting the E-OAM frame from the output side interface card 110 of the same communication apparatus 800 as that of the input side interface card 110.

In FIG. 38, an OAM generating part 165 is provided in the OAM terminating card 150. The OAM terminating card 150 may be physically the same as the switch card 120 or the CPU card 130. The OAM generating part 165 periodically generates an E-OAM frame (autonomous monitoring frame) and transmits the E-OAM frame to the input side interface card 110.

In the input side interface card 110, a multiplexing part 166 multiplexes the generated E-OAM frame with a LAN frame input from an outside line. The generated E-OAM frame has a VLAN value different from that of the LAN frame input from the outside line and is set not to terminate in the input interface card 110 by the frame determination table part 113. Alternatively, as long as the generated E-OAM frame can be differentiated from the LAN frame, a specific MAC address may be used instead of using a different VLAN value for the LAN frame input from the outside line.

In the output side interface card 110, the generated E-OAM frame is set to terminate by the frame determination table part 143 and the OAM determination table part 145.

Thereby, the E-OAM frame, which is periodically generated in the OAM generating part 165, can be terminated in the OAM terminating part 151. Further, the OAM terminating part 151 can inspect whether it periodically receives the generated E-OAM frame. Accordingly, the communication apparatus 800 can autonomously monitor a frame path provided in the communication apparatus 800.

[Seventeenth Embodiment]

A seventeenth embodiment of the present invention is described with reference to FIG. 38. In the ninth embodiment, the number of OAM frames subjected to OAM frame determination is counted. The seventeenth embodiment also counts the number of OAM frame subjected to OAM frame determination but in units of OAM types.

That is, after a LAN frame(s) is determined as an OAM frame by the OAM determination table part 115, 145, the LAN frame determined as the OAM frame is transmitted as an OAM frame to the OAM frame counter 118, 134 via the selecting part 116, 133. In counting the OAM frames, the OAM frame counter 118, 134 counts the OAM frames in OAM type units. Accordingly, among the OAM frames transmitted to the OAM frame counter 118, 134, the number of CC type OAM frames and the number of LB type OAM frames can be counted independently.

With the seventeenth embodiment, by counting the number of OAM frames in OAM type units, it can be determined what type and how many OAM frames have been received.

With the above-described embodiments of the present invention, even in a case of handling various types of E-OAM frames (e.g., E-OAM frame attached to VLAN tags (including multi-level VLAN tags), E-OAM frames without VLAN tags, E-OAM frames of different levels), the number of entries of a table used for determining LAN frames can be significantly reduced. Further, with the above-described embodiments of the present invention, an MEP point or an MIP point can be set in an input side interface card and an output side interface card. Further, with the above-described embodiments of the present invention, a frame communication path inside a communication path can be monitored by using E-OAM frames. Therefore, the above-described embodiments of the present invention significantly contribute to improving reliability of a LAN network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus for receiving one or more frames from a network, the communication apparatus comprising:
    a first determining part configured to search a first table by using a Virtual Local Area Network (VLAN) identifier included in one of the frames;
    a second determining part configured to search a second table by referring to a search result of the first determining part and using an Operation Administration Maintenance (OAM) identifier included in the one of the frames;
    a selecting part configured to determine whether the one of the frames is an OAM frame according to the search result of the second determining part; and
    a terminating part configured to terminate the one of the frames determined as the OAM frame by the selecting part;
    wherein the second table includes OAM type data;
    wherein the OAM type data of the second table includes at least one of OAM data, non-OAM data, and no-hit data;
    wherein the selecting part is configured to discard the one of the frames when the second determining part determines that the OAM identifier of the one of the frames does not match the OAM data, the non-OAM data, or the no-hit data included in the OAM type data in the second table.

2. The communication apparatus as claimed in claim 1, wherein the first determining part is configured to include a Maintenance entity group End Point (MEP) identifier in the search result of the first determining part.

3. The communication apparatus as claimed in claim 1, wherein the first determining part is configured to include a Maintenance entity group Intermediate Point (MIP) identifier in the search result of the first determining part.

4. The communication apparatus as claimed in claim 1, wherein the first determining part is configured to search the first table by using more than one of the VLAN identifiers included in the one of the frames.

5. The communication apparatus as claimed in claim 1, wherein the first determining part is configured to search the first table with respect to a port corresponding to the one of the frames by using the VLAN identifier included in the one of the frames.

6. The communication apparatus as claimed in claim 1, wherein the first determining part is configured to include a frame discard factor in the search result of the first determining part, wherein the second determining part is configured to include another frame discard factor in the search result of the second determining part.

7. The communication apparatus as claimed in claim 1, further comprising:
    a counter configured to count the number of the frames that have been subjected to the determination of the selecting part.

8. The communication apparatus as claimed in claim 7, wherein the counter is configured to count the number of the frames that have been subjected to the determination of the selecting part with respect to an OAM type of the OAM frame.

9. The communication apparatus as claimed in claim 1, further comprising:
    an input side interface card including the first determining part, the second determining part, the selecting part, and the terminating part; and
    an output side interface card including another selecting part and another terminating part;
    wherein the other selecting part substantially has the same configuration as the selecting part, and the other terminating part substantially has the same configuration as the terminating part.

10. The communication apparatus as claimed in claim 9, wherein the output side interface card further includes another first determining part and another second determining part, wherein the other first determining part substantially has the same configuration as the first determining part, wherein the other second determining part substantially has the same configuration as the second determining part.

11. The communication apparatus as claimed in claim 1, further comprising:
    an input side interface card including the first determining part, the second determining part, and the selecting part; and
    an output side interface card including another first determining part, another second determining part, and another selecting part;
    wherein the other first determining part substantially has the same configuration as the first determining part, wherein the second determining part substantially has the same configuration as the second determining part, wherein the other selecting part substantially has the same configuration as the selecting part;
    wherein the terminating part is shared by the input side interface card and the output side interface card.

12. A method for terminating a maintenance message included in one or more frames received from a network, the method comprising:
    searching a first table by using a Virtual Local Area Network (VLAN) identifier included in one of the frames;
    searching a second table by referring to the search result of the searching of the first table and using an Operation Administration Maintenance (OAM) identifier included in the one of the frames;
    determining whether the one of the frames is an OAM frame according to the search result of the searching of the second table; and
    terminating the one of the frames determined as the OAM frame by the determining;
    wherein the second table includes OAM type data including at least one of OAM data, non-OAM data, and no-hit data;
    wherein the determining includes discarding the one of the frames when the OAM identifier of the one of the frames is determined not to match the OAM data, the non-OAM data, or the no-hit data included in the OAM type data in the second table.

13. The method as claimed in claim 12, wherein the search result of the searching of the first table includes a Maintenance entity group End Point (MEP) identifier.

14. The method as claimed in claim 12, wherein the search result of the searching of the first table includes a Maintenance entity group Intermediate Point (MIP) identifier.

15. The method as claimed in claim 12, wherein the searching of the first table includes searching the first table by using more than one of the VLAN identifiers included in the one of the frames.

16. The method as claimed in claim 12, wherein the searching of the first table includes searching the first table with respect to a port corresponding to the one of the frames by using the VLAN identifier included in the one of the frames.

17. The method as claimed in claim 12, wherein the searching of the first table includes outputting the search result including a frame discard factor, wherein the searching of the second table includes outputting the search result including another frame discard factor.

18. The method as claimed in claim 12, further comprising:
counting the number of the frames that have been subjected to the determining of whether the frame is the OAM frame.

\* \* \* \* \*